(12) United States Patent
Thompson, III et al.

(10) Patent No.: US 7,792,121 B2
(45) Date of Patent: Sep. 7, 2010

(54) FRAME PROTOCOL AND SCHEDULING SYSTEM

(75) Inventors: R. Donald Thompson, III, Mercer Island, WA (US); Davide Massarenti, Seattle, WA (US); Cosmin A. Corbea, Bellevue, WA (US); Gerald F. Cermak, Bothell, WA (US); Gideon A. Yuval, Mercer Island, WA (US)

(73) Assignee: Microsoft Corporation, Redmond, WA (US)

( * ) Notice: Subject to any disclaimer, the term of this patent is extended or adjusted under 35 U.S.C. 154(b) by 1999 days.

(21) Appl. No.: 10/336,240

(22) Filed: Jan. 3, 2003

(65) Prior Publication Data
US 2004/0131014 A1    Jul. 8, 2004

(51) Int. Cl.
*H04L 12/56* (2006.01)
(52) U.S. Cl. ............... 370/395.4; 370/437; 370/458; 370/462; 370/474; 370/498
(58) Field of Classification Search .......... 370/395.4, 370/395.41, 395.42, 395.32, 468, 470, 471, 370/472, 473, 474, 458, 462, 498
See application file for complete search history.

(56) References Cited

U.S. PATENT DOCUMENTS

| | | | |
|---|---|---|---|
| 2,824,218 A | 2/1958 | Gilliland | |
| 4,665,519 A | 5/1987 | Kirchner et al. | 370/94 |
| 4,761,796 A | 8/1988 | Dunn et al. | 375/1 |
| 5,043,871 A * | 8/1991 | Nishigaki et al. | 1/1 |
| 5,046,066 A | 9/1991 | Messenger | 370/94.1 |
| 5,105,396 A | 4/1992 | Ganter et al. | 368/47 |
| 5,159,331 A | 10/1992 | Park et al. | 340/7.44 |
| 5,266,945 A | 11/1993 | Peek et al. | 340/7.33 |
| 5,297,118 A | 3/1994 | Sakumoto | 368/10 |

(Continued)

FOREIGN PATENT DOCUMENTS

EP        0 733 983        9/1996

(Continued)

OTHER PUBLICATIONS

Gasgill et al., "High Speed Subcarrier Data Systems (HSDS)," *Seiko Communications*, Sep. 21, 1993, 14 pgs.

(Continued)

*Primary Examiner*—Salman Ahmed
(74) *Attorney, Agent, or Firm*—Merchant & Gould, P.C.

(57) ABSTRACT

Serialized data from broadcast services is provided to a broadcast server for transmitting to one or more client devices. The serialized data may correspond to shared data, private data, or control data. Data is scheduled for transmission based on weighted priorities including quality of service metrics. The transmission frame is arranged according to a frame protocol that includes provisions for a table of contents indexing system for the shared data. Packets of shared data are formatted based on criteria that is known by the particular broadcast service and corresponding application that is resident on the client device. The client device receives the table of contents at the transport layer, and notifies applications of data that will be available in the next frame. Applications submit prioritized requests to the transport layer, requesting data in the next frame. Data is retrieved by the transport layer, and deserialized by handlers for each application.

65 Claims, 14 Drawing Sheets

U.S. PATENT DOCUMENTS

| | | | | |
|---|---|---|---|---|
| 5,329,501 | A | 7/1994 | Meister et al. | 368/10 |
| 5,475,653 | A | 12/1995 | Yamada et al. | 368/10 |
| 5,479,378 | A | 12/1995 | Yamada et al. | 368/10 |
| 5,528,559 | A | 6/1996 | Lucas | 368/10 |
| 5,572,488 | A | 11/1996 | Yamada et al. | 368/10 |
| 5,724,323 | A * | 3/1998 | Mamiya et al. | 369/30.09 |
| 5,745,488 | A * | 4/1998 | Thompson et al. | 370/395.31 |
| 5,757,782 | A | 5/1998 | Gaskill | 370/313 |
| 5,854,985 | A | 12/1998 | Sainton et al. | 455/553 |
| 5,877,744 | A | 3/1999 | Gaskill | 345/146 |
| 5,928,322 | A | 7/1999 | Bitar et al. | 709/4 |
| 5,974,034 | A | 10/1999 | Chin et al. | 370/328 |
| 5,982,449 | A * | 11/1999 | Nagai et al. | 348/553 |
| 6,012,159 | A | 1/2000 | Fischer et al. | 714/755 |
| 6,084,828 | A | 7/2000 | Bland et al. | 368/80 |
| 6,111,896 | A | 8/2000 | Slattery et al. | 370/535 |
| 6,167,382 | A * | 12/2000 | Sparks et al. | 705/26 |
| 6,175,729 | B1 | 1/2001 | He et al. | 455/344 |
| 6,211,860 | B1 | 4/2001 | Bunsen | 345/157 |
| 6,212,414 | B1 | 4/2001 | Alameh et al. | 455/575 |
| 6,282,435 | B1 | 8/2001 | Wagner et al. | 455/566 |
| 6,457,112 | B2 * | 9/2002 | Hostetter | 711/170 |
| 6,466,343 | B1 * | 10/2002 | Lahat et al. | 398/82 |
| 6,549,536 | B1 | 4/2003 | Pavesi et al. | 370/395.31 |
| 6,580,664 | B2 | 6/2003 | Magnusson | 368/47 |
| 6,694,316 | B1 | 2/2004 | Langseth et al. | 707/10 |
| 6,735,219 | B1 * | 5/2004 | Clauberg | 370/474 |
| 6,751,164 | B1 | 6/2004 | Sekiguchi | 368/80 |
| 6,762,728 | B2 | 7/2004 | Koyama et al. | 343/718 |
| 6,967,903 | B2 | 11/2005 | Guanter | 368/224 |
| 7,401,126 | B2 * | 7/2008 | Pekkala et al. | 709/217 |
| 7,486,673 | B2 * | 2/2009 | Harijono et al. | 370/389 |
| 7,715,401 | B2 * | 5/2010 | Yoshimoto et al. | 370/392 |
| 2002/0194613 | A1 * | 12/2002 | Unger | 725/118 |
| 2003/0154492 | A1 | 8/2003 | Falvo et al. | 725/113 |
| 2004/0047244 | A1 | 3/2004 | Iino et al. | 368/276 |
| 2004/0064574 | A1 * | 4/2004 | Kurauchi | 709/231 |
| 2004/0131014 | A1 * | 7/2004 | Thompson et al. | 370/230 |
| 2004/0148501 | A1 * | 7/2004 | Livaditis et al. | 713/161 |
| 2004/0215803 | A1 * | 10/2004 | Yamada et al. | 709/231 |
| 2005/0066037 | A1 | 3/2005 | Song et al. | 709/227 |
| 2005/0257400 | A1 | 11/2005 | Sommerer et al. | 36/13 |
| 2007/0047457 | A1 * | 3/2007 | Harijono et al. | 370/250 |
| 2007/0160208 | A1 * | 7/2007 | MacLean et al. | 380/210 |
| 2008/0168398 | A1 | 7/2008 | Geelen et al. | 715/854 |
| 2008/0298370 | A1 * | 12/2008 | Yoshimoto et al. | 370/395.31 |
| 2008/0313215 | A1 | 12/2008 | Beker et al. | 707/102 |
| 2009/0089676 | A1 | 4/2009 | Finkelstein et al. | 715/719 |
| 2009/0100380 | A1 | 4/2009 | Gardner et al. | 715/854 |
| 2009/0187938 | A1 * | 7/2009 | de Heer et al. | 725/34 |
| 2009/0281792 | A1 * | 11/2009 | Green et al. | 704/9 |
| 2009/0292707 | A1 * | 11/2009 | Moritani et al. | 707/9 |

FOREIGN PATENT DOCUMENTS

| | | |
|---|---|---|
| JP | 2000-155638 | 3/1999 |
| KR | 10-0308152 | 9/2001 |
| WO | WO 99/12109 | 3/1999 |
| WO | WO 00/28680 | 3/2000 |
| WO | WO 02/15607 | 2/2002 |

OTHER PUBLICATIONS

Sinclair, "The FM Wristwatch Radio," last updated Jan. 7, 1997 1 pg.
LTJ Designs, "Sinclair Watch Radio," last updated Jun. 6, 2000, 4 pgs.
Ambient, "Ambient Devices," Sep. 5, 2002, 3 pgs.
Ambient, "The Ambient Platform," Sep. 5, 2002, 2 pgs.
Office Action mailed Jan. 26, 2010, in Japanese Patent Application No. 2004-000702.

* cited by examiner

FRAME PROTOCOL AND SCHEDULING SYSTEM

FIELD OF THE INVENTION

The present invention relates generally to broadcast systems. More particularly, the present invention relates to a system and method for scheduling the transmission of data streams from a broadcast server to one or more client devices. The data streams are scheduled for transmission based on weighted priorities including quality of service metrics. The transmission streams are arranged according to a frame protocol that supports private data, shared data, and control data. Shared data transmission streams are indexed according to a flexibly defined table of contents that is application specific.

BACKGROUND OF THE INVENTION

As society becomes increasingly mobile, mobile computing devices are enjoying a tidal wave of popularity and growth. Cell phones, wireless PDAs, wireless laptops and other mobile communication devices are making impressive inroads with mainstream customers. Constraining this growth and limiting customer satisfaction, however, is the lack of a truly adequate high-coverage-area, inexpensive, small, battery-efficient wireless communication system. Cellular data-transmit telephony-based solutions are far from power-efficient, and impose (relative) cost and size burdens that make them unusable. Likewise, other attempts to solve these problems have proved equally unsuitable. For instance, a few entities have attempted to make use of mobile devices that receive information over Frequency Modulated (FM) sub-carriers. FM sub-carriers (also known as "SCA" for Subsidiary Communications Authorization) utilize the available frequencies above FM stereo within the available modulation bandwidth of an FM station. Sub-carriers are typically leased from radio stations, subject to FCC or other national regulation.

Some examples of FM sub-carrier systems include the QUOTREK system owned and maintained by the Data Broadcast Corporation (DBC) to deliver stock price quotes to a handheld mobile device. However, the QUOTREK system is a single purpose system limited to receiving stock quotes. The system has various other limitations that make it unusable as a mobile computing device. Likewise, the Seiko Corporation implemented an FM sub-carrier system wherein short messages were transmitted to a wrist-worn device. However, the hardware and communications scheme used were relatively primitive, resulting in a need for excessive redundancy in message transmission. These and other shortcomings rendered the Seiko system less than acceptable. Similarly, certain paging systems are based on FM sub-carrier use, such as the Radio Data System (RDS) or Mobile Broadcasting System (MBS) systems. However, those systems involve short messages transmitted in a broadcast fashion with limited data rates. Unfortunately, an acceptable mobile device solution has eluded those skilled in the art.

SUMMARY OF THE INVENTION

Briefly stated, the present invention is related to a system and method for scheduling transmissions. Data streams are transmitted from a broadcast server to one or more client devices. Services provide serialized data to the scheduler in the broadcast server. The serialized data may correspond to shared data, private data, or control data. Data streams are scheduled for transmission based on weighted priorities including quality of service metrics. The transmission frame is arranged according to a frame protocol that includes provisions for a flexible table of contents indexing system for the shared data. Packets of shared data are formatted based on criteria that is known by the particular broadcast service and corresponding application that is resident on the client device. The client device receives the table of contents at the transport layer, and notifies applications of data that will be available in the next frame. The applications submit prioritized requests to the transport layer, requesting data in the next frame. Data is retrieved for each application by the transport layer, and deserialized by a handler for each application. Private data is pseudo-randomly assigned to slots in partitions of the transmission frame, such that each subscriber has a unique set of private, data slots. Private data is encrypted according to prevent unauthorized reception.

A more complete appreciation of the present invention and its improvements can be obtained by reference to the accompanying drawings, which are briefly summarized below, to the following detailed description of illustrative embodiments of the invention, and to the appended claims.

DETAILED DESCRIPTION OF THE PREFERRED EMBODIMENT

Figure 1:
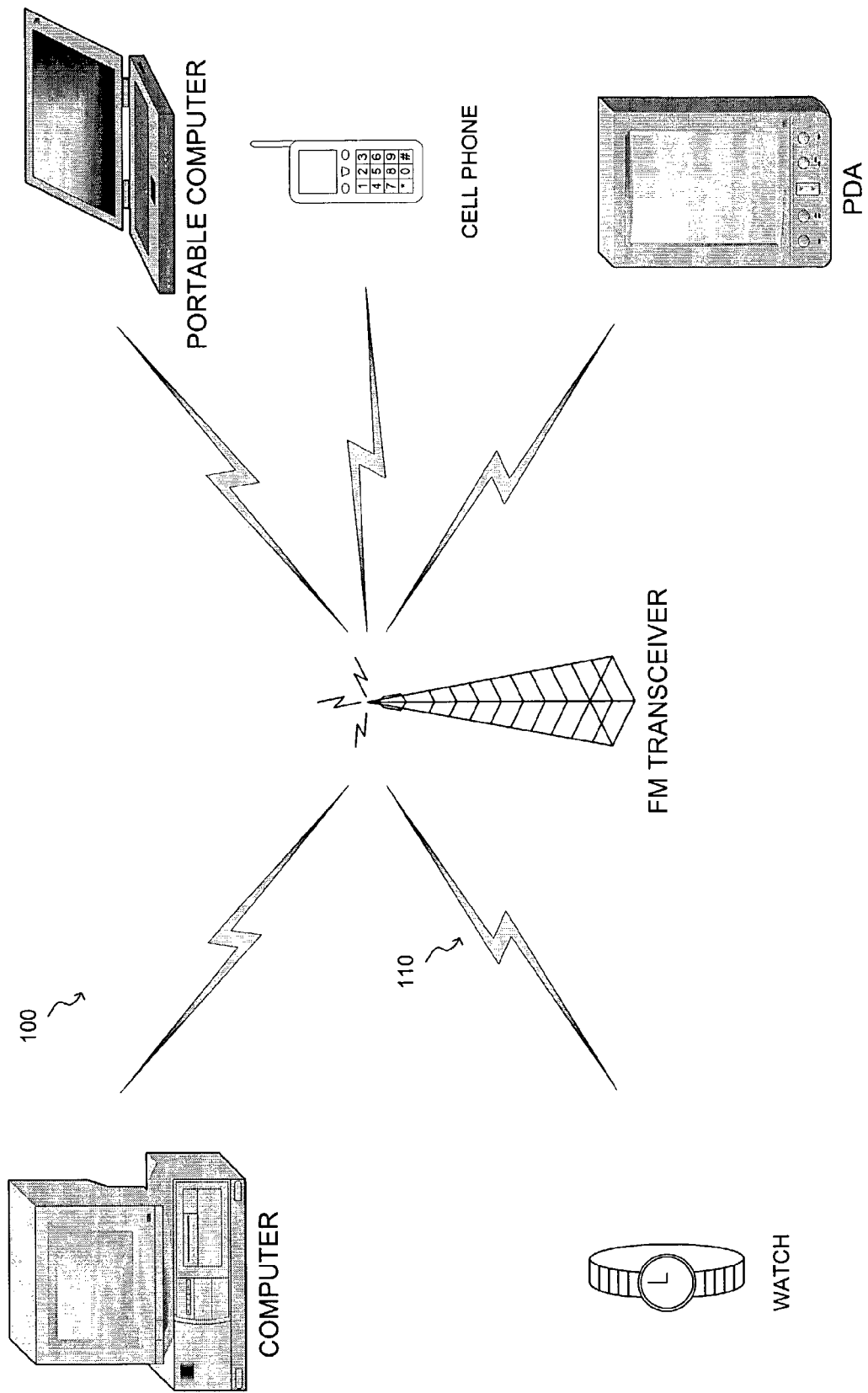
FIG. 1 is a diagram illustrating an operating environment.

The present invention is described in the context of a communication system that includes wireless client devices. In the described embodiments, the client devices may be watch type devices that are specially configured to receive communication signals, as is described in greater detail below. As will become apparent from a reading of the following detailed description, the client devices receive broadcast transmission from one or more broadcast towers. The broadcast transmissions are provided according to frame protocol as will be further described. The structure of the frame is arranged with a table of contents for shared data such that wireless devices with limited memory storage are capable of receiving messages.

Although described here in the context of a watch-based system, it will be apparent that the teachings of the application have equal applicability to any other mobile or nonmobile devices, such as portable and desktop computers, personal digital assistants (PDAs), cellular telephones, alarm clocks, key-chains, refrigerator magnets, wall clocks, and the like. The use of a watch is for illustrative purposes only to simplify the following discussion, and may be used interchangeably with "mobile device", and/or "client device". The terms "client" and "subscriber" are interchangeable terms that describe a user of a service. Each client (or subscriber) may have more than one client device, where each client device is identified with the client (or subscriber).

"Computer readable media" can be any available media that can be accessed by client/server devices. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by client/server devices. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above are included within the scope of computer readable media.

The overall operating environment for the frame protocol will be discussed as follows below with reference to FIGS. 1-3.

Operating Environment

FIG. 1 illustrates an exemplary operating environment (100) for the present invention. As illustrated in the figure, an FM transceiver or broadcast is transmitted over a communication channel (110) to various electronic devices. Example electronic devices that have an FM receiver or transceiver may include a desktop computer, a watch, a portable computer, a wireless cellular telephone (cell phone), and a personal data assistant (PDA). The electronic devices are arranged to receive information from the FM broadcast. The FM broadcast may be of any number of types including but not limited to: a standard FM transmission, a sub-carrier FM transmission, or any other type of FM transmission as may be desired.

FM sub-carriers are often referred to as an SCA as identified by the Federal Communications Committee (FCC) term for the Subsidiary Communications Authorization. An FM sub-carrier utilizes bandwidth that is otherwise unused in the FM stereo-band about an FM station. In the United States of America the FCC requires the modulation bandwidth to be roughly from 53 KHz to 100 KHz within the modulation bandwidth of the FM station.

Example electronic devices that may include an electronic system that is arranged to operate according to the interaction model are illustrated in FIG. 1. The electronic system may employ a wireless interface such as the FM transmission systems that are described above. Each of the electronic systems receives message streams over the communication channel.

Each broadcast transmission corresponds to the transmission of one or more frames. Each frame may include multiple messages, where some messages are public broadcast (aka "global" or "shared" messages), while other messages are client specific messages (aka "personal" or "private" messages). Every client that is located within the designated service region may receive shared data, while a single client may decode private data. As describer previously, a subscriber (or client) may have of more than one client device, where each client device may be capable of receiving transmissions that are accessible by the subscriber.

Electronic devices (e.g., a wireless watch device) receive packets that are directed to the client device. Packets are organized in groups according to logical slot (or channel) entry numbers. Slots are associated with broadcast services that correspond to a station of channel. Each electronic device may be configured to receive a different group of channels. The packets associated with each of those channels is received, processed, and stored in the client device. The stored packets are retrieved by applications that reside on the client device. Each application on the client device is associated with a particular service that is associated with the broadcast server and the particular channel. Example channels include: a time channel, a messages channel, a contact channel, a calendar channel, a weather channel, a stocks channel, a news channel, and a games channel.

Illustrative Electronic System

Figure 2:
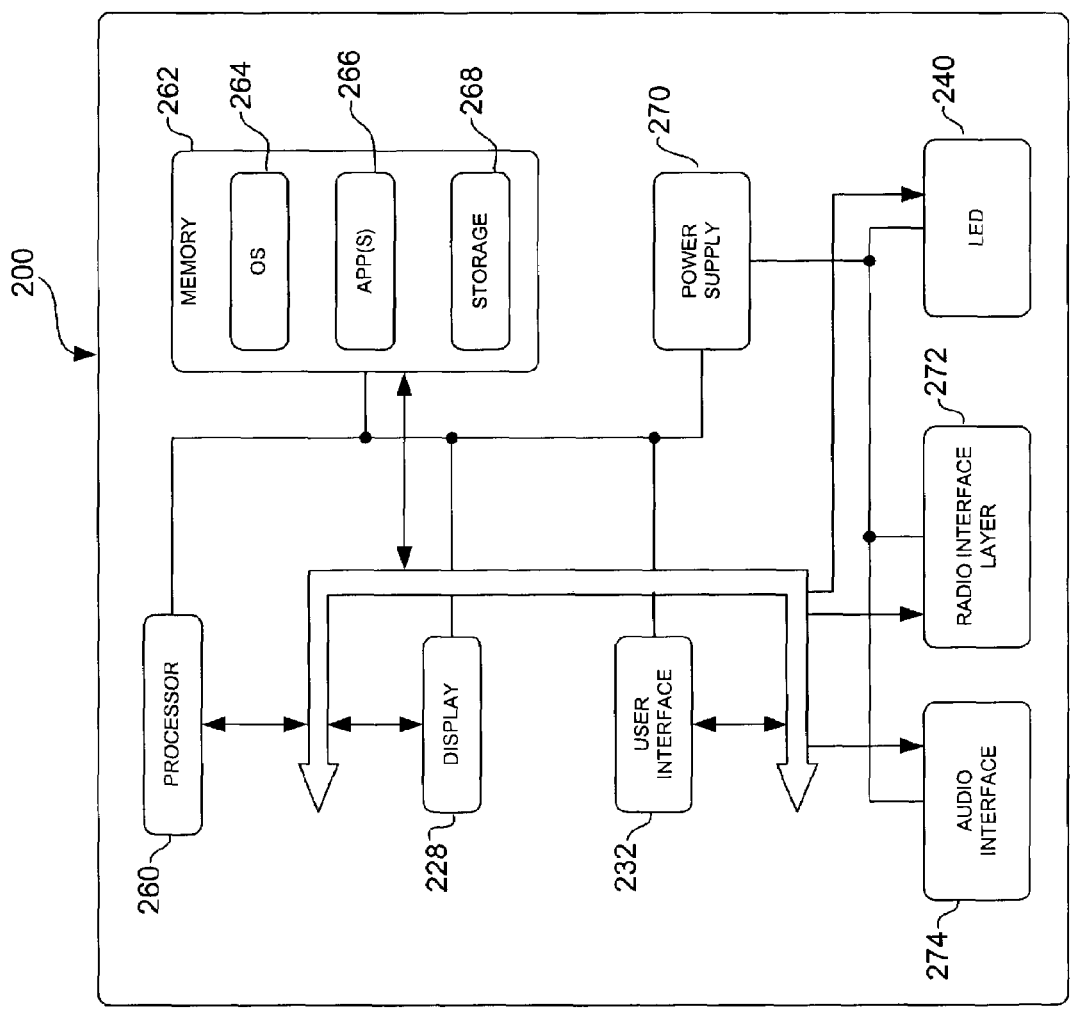
FIG. 2 is a diagram illustrating functional components of an electronic device.

FIG. 2 is a schematic diagram illustrating functional components of an electronic device (200) that is arranged according to the present invention. The electronic device (200) has a processor (260), a memory (262), a display (228), and a user interface (232). The memory (262) generally includes both volatile memory (e.g., RAM) and non-volatile memory (e.g., ROM, Flash Memory, or the like). The electronic device (200) includes an operating system (264), such as the Windows CE operating system from Microsoft Corporation or another operating system, which is resident in the memory (262) and executes on the processor (260). The user interface (232) may be a series of push buttons, a scroll wheel, a numeric dialing pad (such as on a typical telephone), or another type of user interface means. The display (228) may be a liquid crystal display, or any other type of display as previously described. In one example, the display (228) may be touch-sensitive that would act as an input device.

One or more application programs (266) are loaded into memory (262) and run on the operating system (264). Examples of application programs include phone dialer programs, email programs, scheduling/calendaring programs, PIM (personal information management) programs, Internet browser programs, and so forth. The electronic device (200) also includes a non-volatile storage (268) that is located within the memory (262). The non-volatile storage (268) may be used to store persistent information which should not be lost if the electronic device (200) is powered down. The applications (266) may use and store information in the storage (268), such as e-mail or other messages used by an e-mail application, contact information used by a PIM, appointment information used by a scheduling program, documents used by a word processing application, instant messages for an instant messaging application, text messages in a text messaging application, and the like.

The electronic device (200) has a power supply (270), which may be implemented as one or more batteries. The power supply (270) might further include an external power source, such as an AC adapter or a powered docking cradle that supplements or recharges the batteries.

The electronic device (200) is also shown with two types of external notification mechanisms: an LED (240) and an audio interface (274). These devices may be directly coupled to the power supply (270) so that when activated, they remain on for a duration dictated by the notification mechanism even though the processor (260) and other components might shut down to conserve battery power. The LED (240) may be programmed to remain on indefinitely until the user takes action to indicate the powered-on status of the device. The audio interface (274) is used to provide audible signals to and receive audible signals from the user. For example, the audio interface (274) may be coupled to a speaker for providing audible output and to a microphone for receiving audible input, such as to facilitate a telephone conversation, or as a user interface using voice recognition.

The electronic device (200) also includes a radio interface layer (272) that performs the function of receiving and/or transmitting radio frequency communications. The radio interface layer (272) facilitates wireless connectivity between the electronic device (200) and the outside world, via a communications carrier or service provider. Transmissions to and from the radio interface layer (272) are conducted under control of the operating system (264). In other words, communications received by the radio interface layer (272) may be disseminated to application programs (266) via the operating system (264), and vice versa.

Illustrative Watch-Based Electronic System

Figure 3:
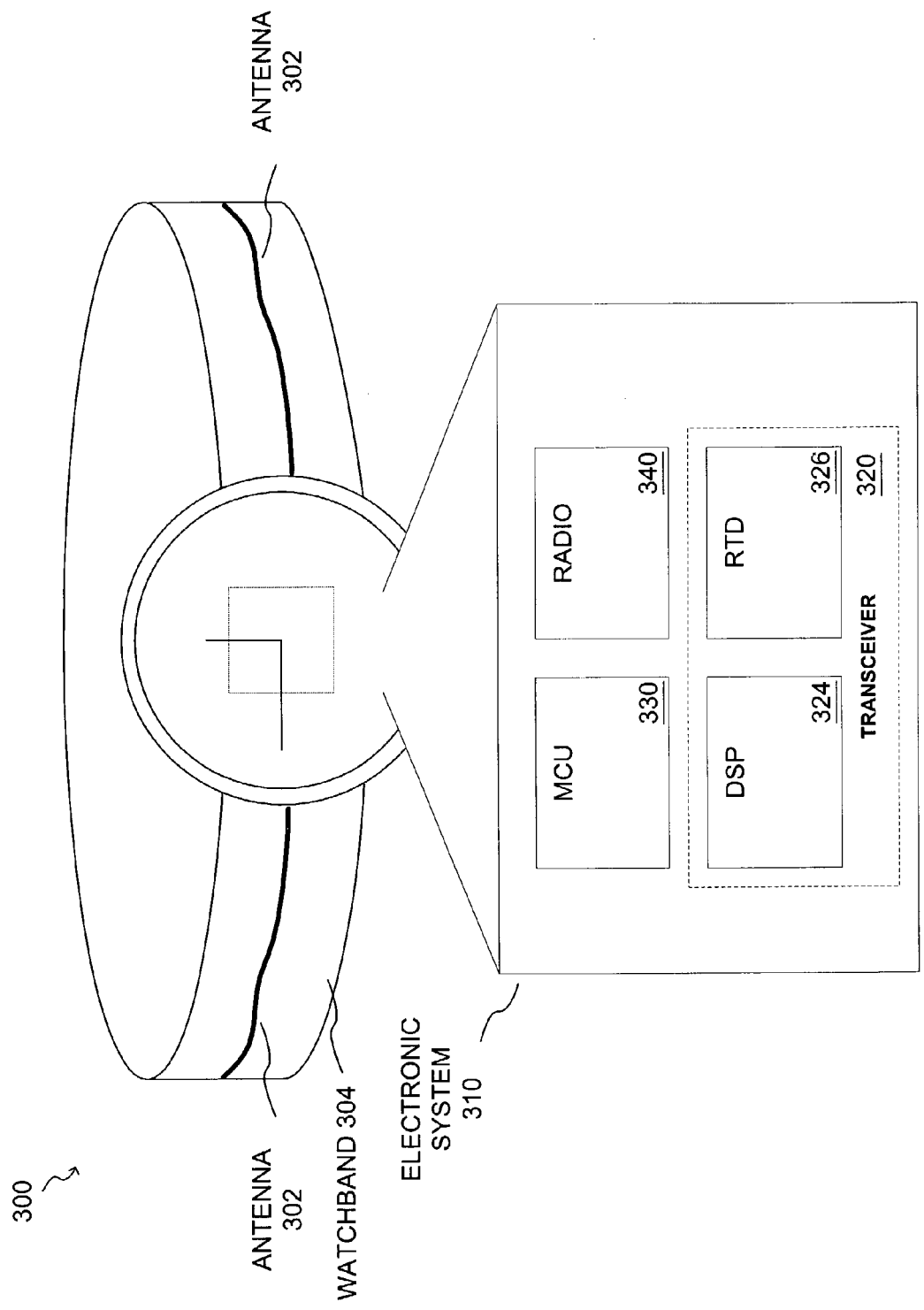
FIG. 3 is a diagram illustrating a watch device that includes an electronic system.

FIG. 3 illustrates an exemplary watch device (300) that includes an electronic system (310) that is configured to operate in accordance with the present invention. The watch device (300) includes a watchband (304) that includes an antenna (302) that is either attached to the watchband or integrally formed within the watchband (304). The antenna (302) is coupled to the electronic system (310) that is contained in the watch. The electronic system (310) may be contained in the bezel as shown in FIG. 3, or in some other portion of the watch device (not shown).

The electronic system (310) is arranged to operate as either a receiver or transceiver type of device. As illustrated in the figure, the electronic system includes a transceiver (320), a microcomputer unit (MCU 330), and an analog radio (340). The antenna connects to, and is controlled by, the transceiver (320). Transactions between the MCU (330) and the radio components are mediated over a MCU-digital transceiver interface. The components of the watch device (300) are housed in a watch-sized enclosure and rely on battery power for operation.

The transceiver (320) generally includes a digital signal processor (DSP 324), which performs control, scheduling, and post-processing tasks for the transceiver, and a real time device (RTD 326), which includes a digital radio, system timing, and real-time event dispatching. The DSP (324) is coupled to the MCU (330), and transceiver tasks are commanded by the MCU (330).

One of the DSP's tasks may process received data for such purposes as sub-carrier phase recovery, baud recovery and/or tracking, compensation for fading effects, demodulation, de-interleaving, channel state estimation and error-correction. The post-processing of packets may occur when an entire packet has been received, or another subsequent time. The DSP (324) analyzes the transmitted data packets to determine the station's signal timing with respect to the local clock of the RTD (326). The local clock is synchronized with the transmitter's clock signal to maintain signal sampling integrity. The receiver is periodically brought into symbol synchronization with the transmitter to minimize misreading of the received data.

The digital section of the RTD (326) may include system time-base generators, such as a crystal oscillator that provides the system clock for the MCU (330) and the DSP (324). The time-base also provides baud and sample timing for transmit and receive operations, start/stop control for radio operation, and controls the periods of clock suspension to the MCU (330) and the DSP (324). The RTD (326) also performs radio operations, and may perform additional operations as well. The radio (340) is arranged to receive segments of data that is arranged in packets.

The operating environment shown in FIGS. 2 and 3 are only examples of suitable operating environments and are not intended to suggest any limitation as to the scope of use or functionality of the invention. Other well known computing systems, environments, and/or configurations that may be suitable for use with the invention include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

Broadcast Services

Figure 4A:
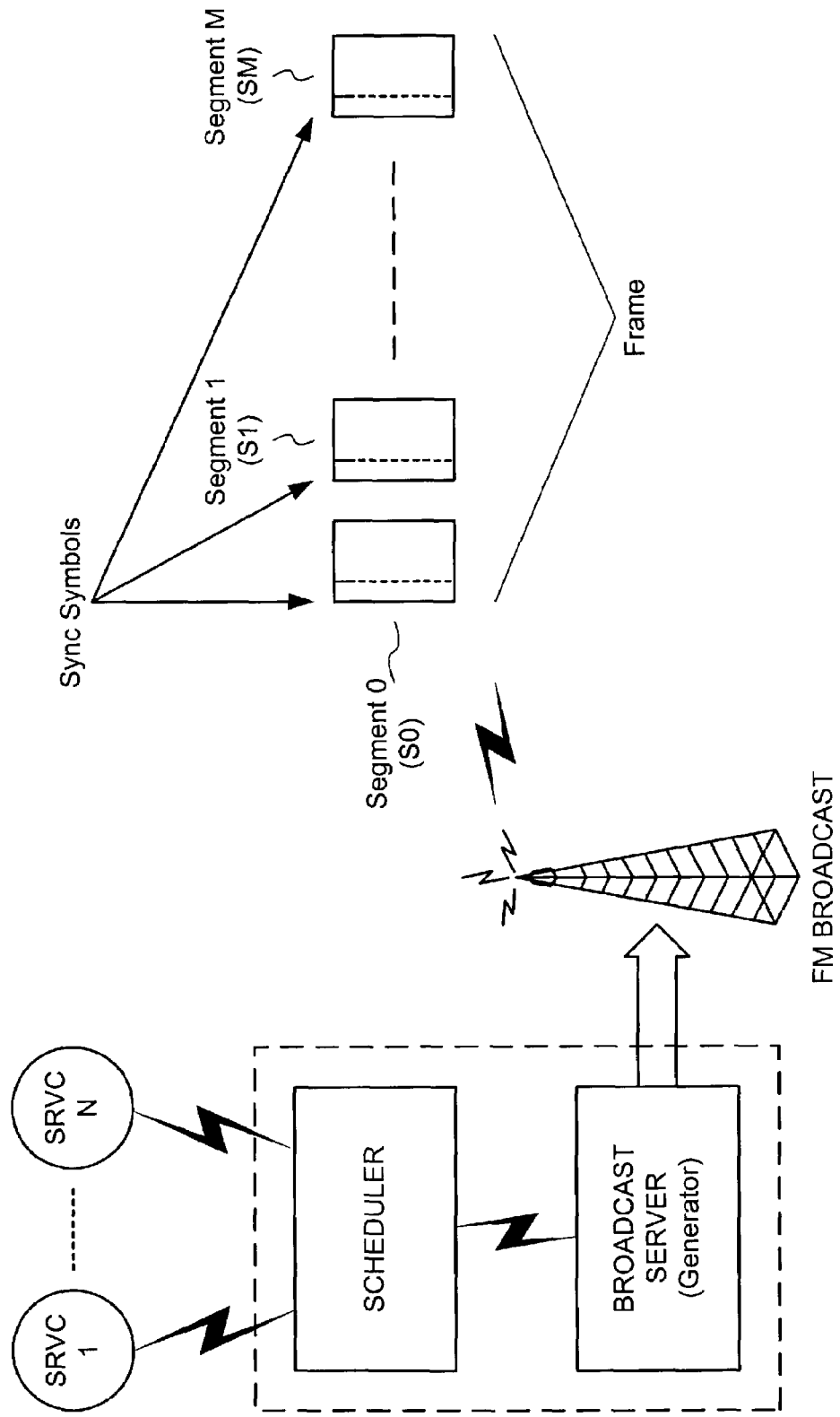
FIG. 4A is a block diagram of a broadcast and scheduling system.

Each broadcast transmitter tower is arranged to provide a communication signal that is configured for reception by wireless client devices within a service region. A service region is a geographic area that is serviced by one or more broadcast transmitter towers (see FIG. 1). An FM broadcast tower transmits signal as directed by a broadcast server device as illustrated in FIG. 4A. The broadcast server device (aka a "generator") may communicate with a scheduler via a network communication link.

The scheduler is configured as a means for selecting one or more services. In one example, a user of a client device interacts with a scheduling interface to select services such as news, stock prices, weather, and other features such as a personal calendar, address book, and the like. The scheduling interface may be a web-based interface that includes provisions to customize subscription to broadcast services. The selected services are communicated to the scheduler, and queued for later transmission. At the designated time (or time interval) the scheduler retrieves serialized data from one or more selected services (e.g., SVC1-SVC N). The scheduler prioritizes the scheduling of transmissions as will be described in further detail later. The scheduled transmissions are communicated to the broadcast server to begin a transmission sequence of data for the selected services. The broadcast server subsequently formats the serialized data into message streams for one or more wireless client device, queues the data for transmission, and communicates the queued data to the FM broadcast tower for transmission. The scheduler may be integrated together with the broadcast server, or as a separate component.

Each broadcast transmission corresponds to the transmission of a frame that is arranged in accordance with a frame protocol. Each frame includes a frame header and multiple data streams. The frame header describes the transmission environment with respect to parameters such as frame number identifier, transmission time, time zone identifier, service region identifiers, as well as other environmental information. The frame header also describes the location of one or more table of contents for shared data within the frame.

Streams can be categorized as shared data (aka broadcast streams), or private data (aka personal data) that is identified with a specific client (subscriber). Each frame includes table of contents that indicate locations within the next transmitted frame where shared data streams are located.

Example Scheduler

Figure 4B:
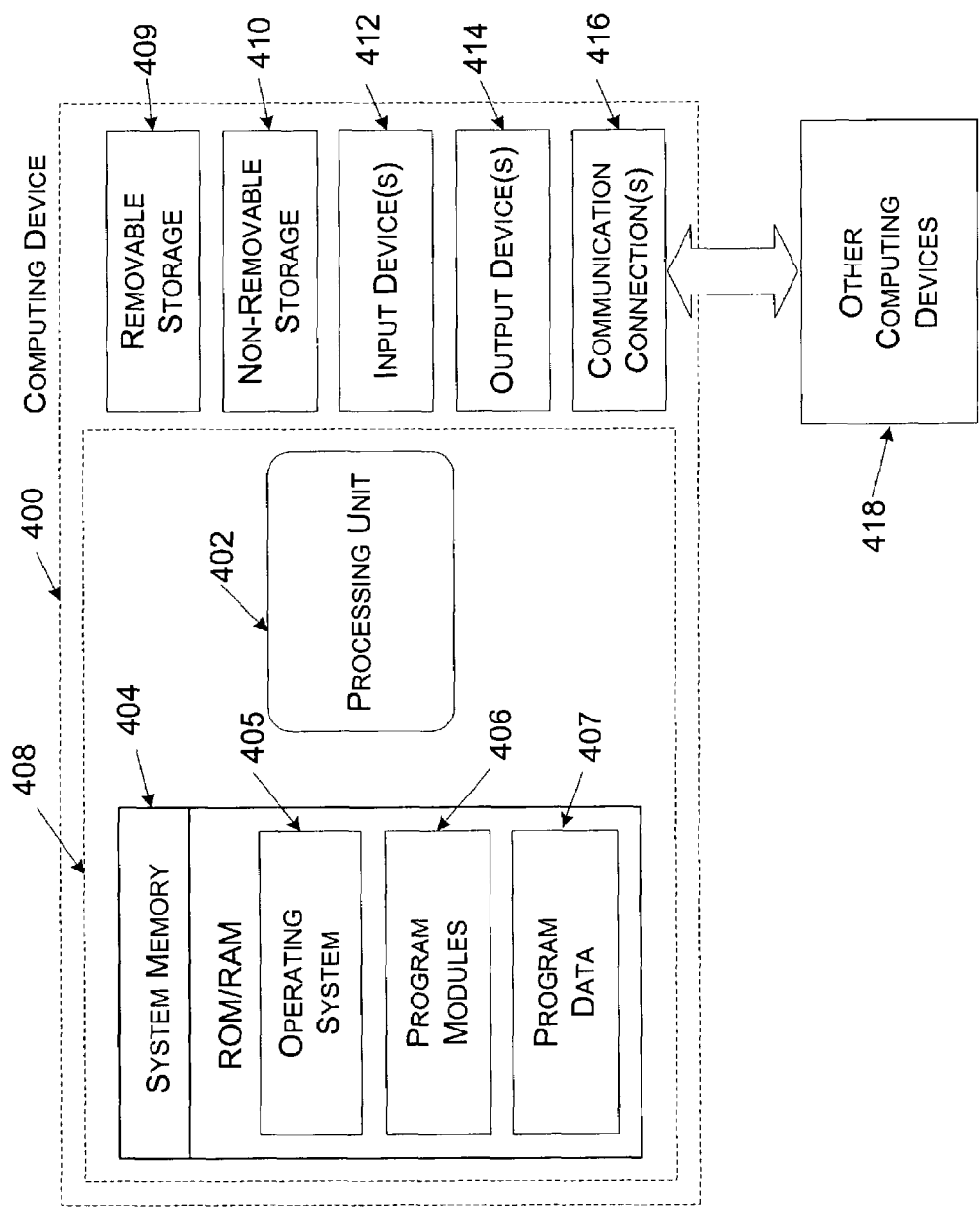
FIG. 4B is a block diagram of an example computing device.

An exemplary scheduler may be implemented as a computing device. Also, the broadcast server may be implemented as a computing device. An exemplary computing device (400) is illustrated in FIG. 4B.

In a basic configuration, computing device 400 typically includes at least one processing unit (402) and system memory (404). Depending on the exact configuration and type of computing device, system memory 404 may be volatile (such as RAM), non-volatile (such as ROM, flash memory, etc.) or some combination of the two. System memory 404 typically includes an operating system (405), one or more program modules (406), and may include program data (407). This basic configuration is illustrated in FIG. 4B by those components within dashed line 408.

Computing device 400 may also have additional features or functionality. For example, computing device 400 may also include additional data storage devices (removable and/or non-removable) such as, for example, magnetic disks, optical disks, or tape. Such additional storage is illustrated in FIG. 4B by removable storage 409 and non-removable storage 410. Computer storage media may include volatile and non-volatile, removable and non-removable media implemented in any method or technology for storage of information, such as computer readable instructions, data structures, program modules or other data. System memory 404, removable storage 409 and non-removable storage 410 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 400. Any such computer storage media may be part of device 400. Computing device 400 may also have input device(s) 412 such as keyboard, mouse, pen, voice input device, touch input device, etc. Output device(s) 414 such as a display, speakers, printer, etc. may also be included. All these devices are known in the art and need not be discussed at length here.

Computing device 400 also contains communications connection(s) 416 that allow the device to communicate with other computing devices 418, such as over a network. Communications connection(s) 416 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, microwave, satellite, infrared and other wireless media. The term computer readable media as used herein includes both storage media and communication media.

Transmission Format

FIG. 4A also illustrates an example frame transmission. Each frame is broken into a number of segments (M). The first portion of each segment includes synchronization (Sync) symbols. The frame is distributed over M segments (S0-SM) such that data integrity is improved. The receiver in the client device establishes timing functions for reception of the data signals with the sync symbols. Each segment includes a number (N) of packets. The order of transmission of various packets and segments may be modified such that frames are interleaved or contiguous.

Figure 4C:
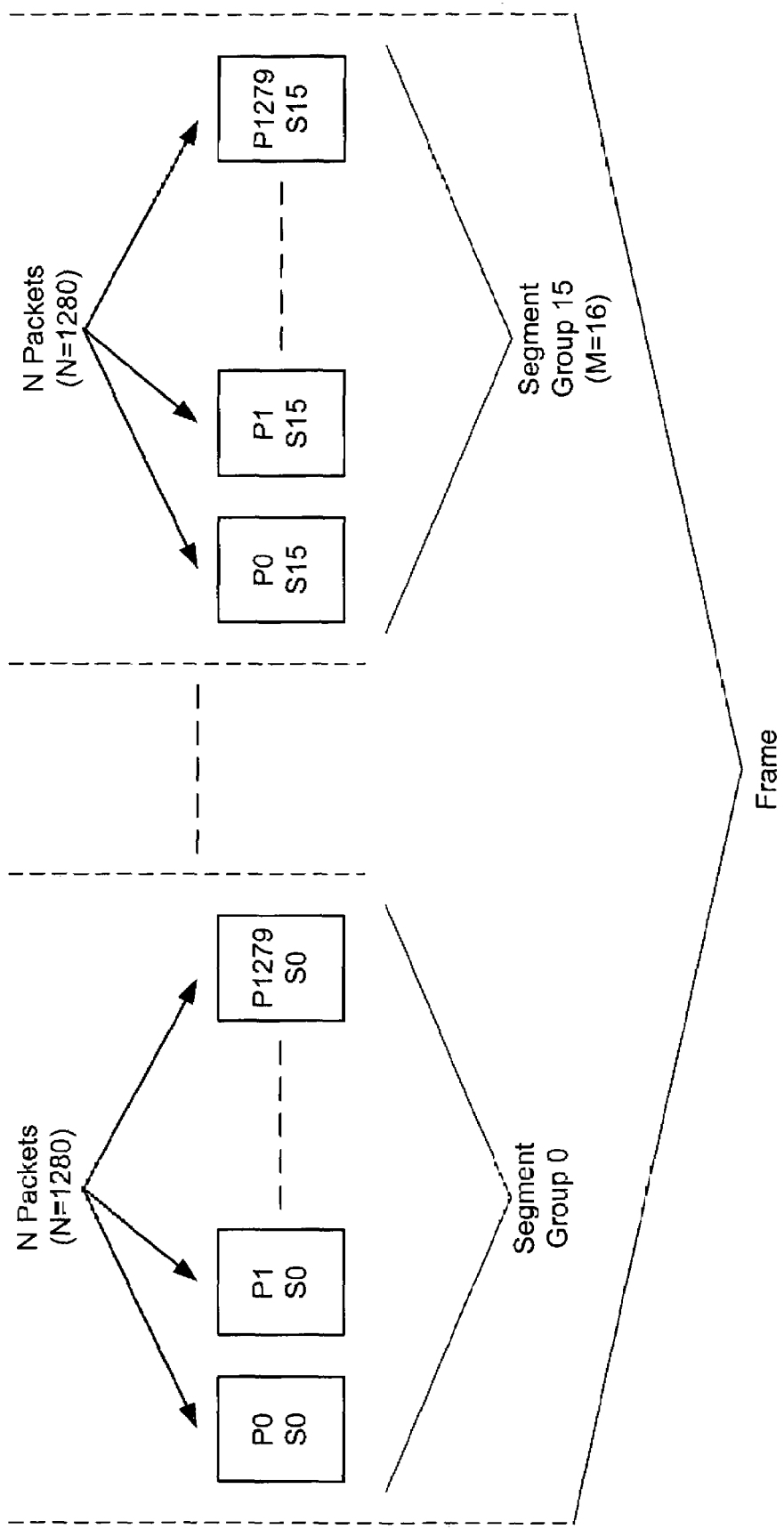
FIGS. 4C and 4D are diagrams illustrating frame transmission sequences.

FIG. 4C is a diagram illustrating an example frame transmission sequence, where each frame includes 16 segment groups that are transmitted as interleaved segments. Each segment includes 1280 packets such that an entire frame includes 20,480 segments. For the example illustrated in FIG. 4C, every packet (Px) for a given segment (Sx) is transmitted in sequence before packets for the next segment is transmitted. The transmission sequence for the example frame is: (S0P0, S0P1 . . . S0P1279); (S1P0, S1P1, . . . , S1P1279); . . . ; (S15P0, S15P1, . . . , S15P1279). According to the example illustrated in FIG. 4C, a new frame transmission begins after the 20,480 segments of the preceding frame are completed.

Figure 4D:
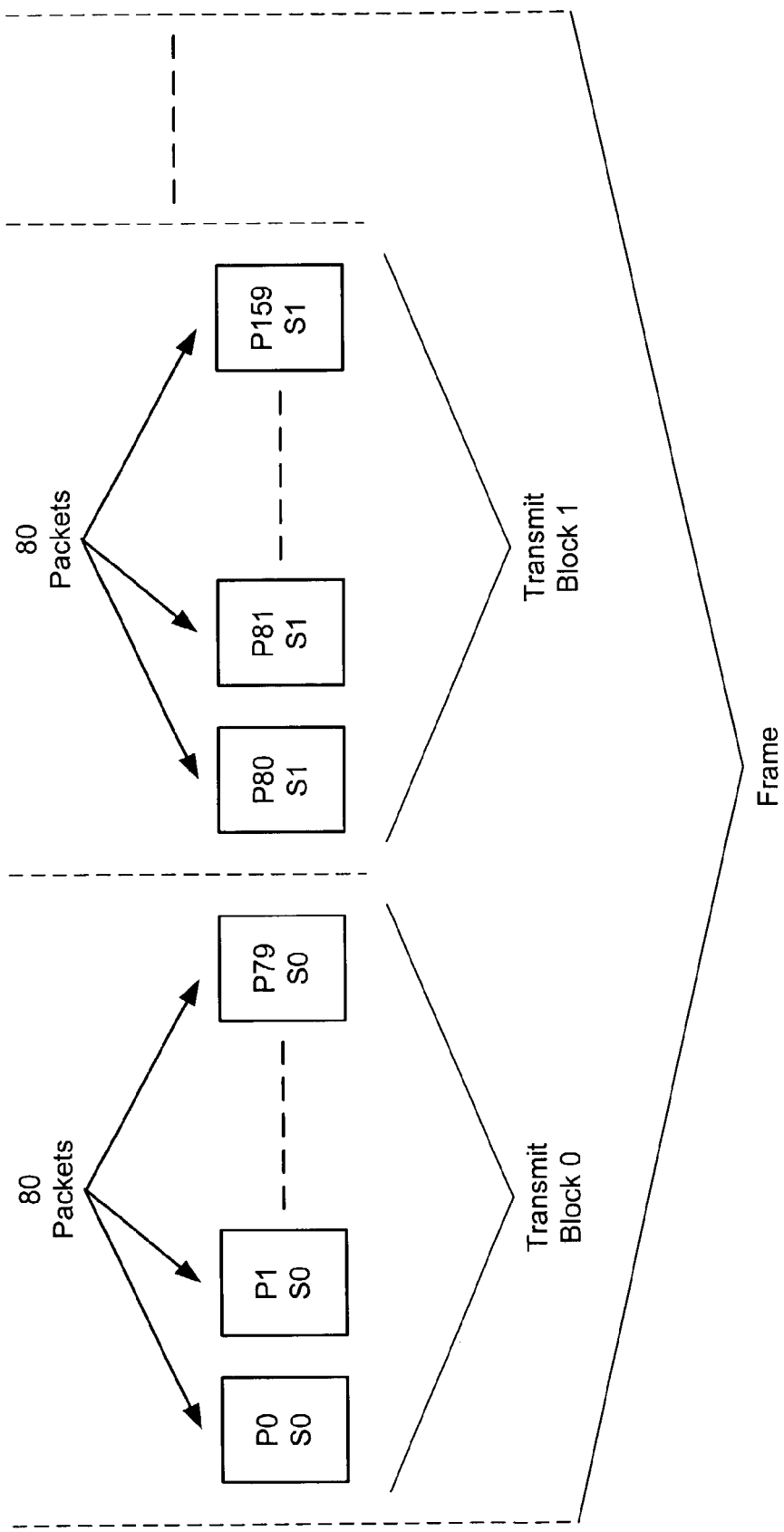

FIG. 4D is a diagram illustrating another example frame transmission sequence, where each frame is divided into blocks of 80 packets from one of 16 segment groups. For the example illustrated in FIG. 6, packets (Px) for a given segment (Sx) are transmitted in an interleaved sequence with packets for the next segment. Each transmission block consists of 80 packets from a particular segment. The transmission sequence for the frame is shown as: (S0P0, S0P1 . . . S0P80); (S1P80, S1P81, . . . , S1P159); . . . etc. According to the example illustrated in FIG. 4D, frame reception of all 20,480 segments is interleaved such that frames are completed on a rolling basis.

Frame Protocol Structure and Interaction

Client devices are organized in a series of layers that are similar to the OSI networking model. The layers include a physical layer, a link layer, a network layer, a transport layer, and an application layer. The physical layer receives the FM subcarrier transmitted information and provides symbols to the link layer. The link layer divides the symbols into segments, and handles viterbi coding, data whitening, and interleaving functions. The network layer receives the segments and creates logical packets. The network layer also handles CRC, encryption, and Reed-Solomon coding. The transport layer decodes the logical packets to retrieve the table of contents, and includes data handlers that handle communication to the application layer. The application layer includes a series of applications that are resident on the client device, and associated with subscriptions to broadcast services.

Figure 5:
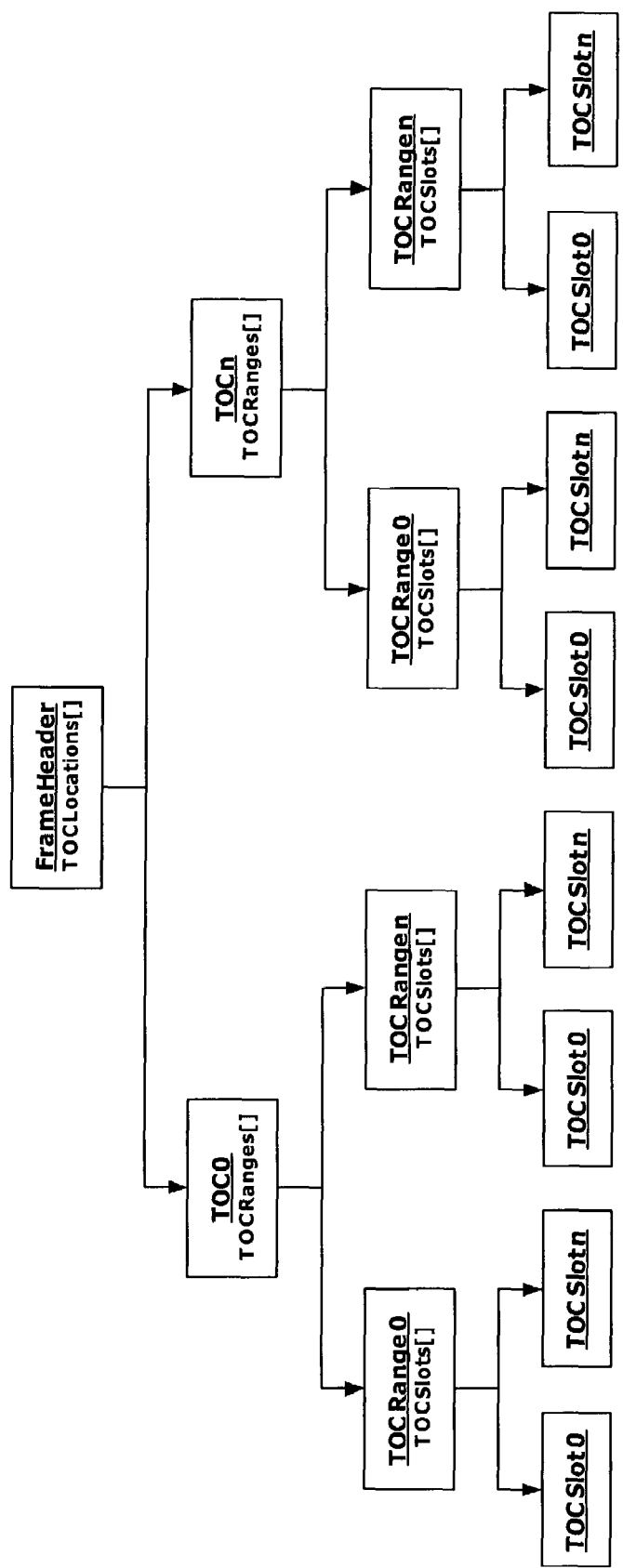
FIG. 5 is a diagram illustrating a frame header including a TOC.

The frame structure includes a number of packets as will be described below with reference to FIG. 5. For the example illustrated herein, each frame includes 20,480 segments that are broken into 16 segment groups of 1280 segments (e.g., see FIG. 4C), where each segment includes 68 symbols, and each symbol represents one packet data bit. Each symbol is transmitted at a bit rate of 12 kbit/s such that each frame transmission is started in roughly 2-minute time intervals. Segments are mapped into logical packets such that 20,480 segments map into 1280 logical packets, or 128 bytes consisting of 16 segments. The location of a packet within a stream is referred to as a slot.

The frame header occurs in a predetermined slot of each transmission frame (e.g., the first packet of the frame transmission) so that client devices can retrieve the frame header packet in a predictable fashion. The frame header packet may include a field for frame number, time stamp, time zone offset, region definition, and table-of-contents (TOC) locations definition. The TOC locations definition field (TOC locations) identifies the slot locations for one or more table of contents that occur in the frame transmission sequence. Each subsequent frame transmission includes another header that may reference a different number of tables of contents. Except for the frame header packet, packets are flexibly defined by the identified service and corresponding application that is resident on the client device.

In some instances, the frame header is not received from a transmission and certain parameters can be estimated based on the last received frame header. In one example, the frame number can be estimated based on the current time and the last known frame number. In another example, the current time is estimated based on the time associated with the last received frame header. For the purposes of the discussions found herein, the term "frame number" and "current time" also refers to an estimated frame number and an estimated time.

The frame number is a sequential number that starts at zero and is incremented with each subsequent frame transmission. The frame number is not practically repeated in a subsequent transmission sequence. For example, when a new frame transmission occurs once every 2 minutes, a 4-byte frame number will not occur for around 15,000 years. The frame number can be used as a seed for encryption and other security safeguards.

The time stamp is in universal time format (UTC) and designates the universal time for the beginning of the frame transmission. The broadcast server will adjust the time stamp for the transmission to account for network latencies on the server side of the transmission. Client devices must compensate for the frame broadcast and processing times. The client device may use the time stamp as a means for synchronizing the client device with the current time in the current broadcast region.

The time zone offset indicates a time zone for the geographic region of the frame transmission. Every frame transmission occurs in a particular geographic region. In one example, the regions are defined relative to Greenwich Mean Time (GMT) designators.

The region definition includes a region ID, a code name, and a list of frequencies. An example region ID is a 16-bit value that uniquely identifies the current broadcast region such that the client can manage roaming, commuting, and travel scenarios. Client devices may include a home geographic region identifier. Client devices can identify the region ID and selectively filter out stations based on a home region. The code name is a string that provides a textual description of the current broadcast region for display and/or informational purposes. The list of frequencies corresponds to radio frequencies that are available within the current broadcast (or service) region. Typical scenarios include very few broadcast stations in each geographic region, although large metropolitan areas such as New York City may include numerous broadcast stations. The values for each entry of the station list may be expressed in terms of an offset from a baseline frequency. An exemplary station list entry may include entries that correspond to a 100 kHz offset from an 88 MHz baseline transmission frequency, ranging up to 108 MHz (the FM broadcast spectrum). Thus, a station list value of 113 corresponds to 11.3 MHz offset from 88 MHz, or a frequency of 99.3 MHz. A special value (e.g., 0xFF) may be used to indicate no station, while another special value (e.g., 0xFF) may be used to indicate that the station list will continue in the next frame transmission (for regions that have more than 16 stations).

The client device uses the station information to assigns itself to a particular frequency using a station assignment procedure. Unassigned client devices scan the entire frequency range (e.g., 88 MHz-108 MHz) to find a frame. After a frame is identified, the client device receives the station list and selects a station (e.g., the home station) using the station assignment procedure. The client device then begins receiving packets from the selected station. Once the client device has made a station assignment, the station list can be ignored in subsequent frames until the client device loses the signal, or the server changes the list (e.g., a flag in the table of contents is set to indicate a change in the header).

A fail-over condition occurs when a station becomes unavailable within a geographic area. For example, the number of broadcast towers in a service region may be variable, and a particular broadcast tower may become unavailable. The fail-over condition may be the result of a broadcast tower going offline unexpectedly, or some other failure condition. The station list serves as a means for discovering available stations within the current geographic region, as given by the region ID, when a fail-over condition occurs, or when additional stations become available.

The frame number (or estimated frame number) and packet number may also be used to determine an initialization vector for an encryption algorithm. The encryption process uses a service key and the initialization vector to encrypt and decrypt packets. For example, a 128-bit service key may be required to encrypt and decrypt a packet for shared data services. The client device has a service key for every registered broadcast service. A data stream for the registered broadcast service can be decrypted from the 128-bit service key.

The broadcast server (aka the scheduler) increases the frame number for every successive frame transmission. An exemplary frame number field is 4 bytes in length. The client device extracts the frame number from the frame header and evaluates the frame number to determine if the frame is a replay attack. A replay attack corresponds to an unrecognized broadcast that is constructed by an attacker that records a number of frames from the original frame transmission and broadcasts frames at a later time with the same frame numbers.

An attacker may attempt a variation on the replay attack by changing the frame number in the frame to an acceptable value. However, when the frame number is used as a seed for calculating an initial value in a feedback-mode packet encryption, the attackers variation replay attack is ineffective. Since the original frame broadcast transmission includes packet encryption using the frame number, the attackers variation replay attack will not include a proper encryption and the client device will discard the packet as invalid. Thus, the frame number may be used as a means for encrypting packets.

The TOC locations definition designates the number of table of contents that are found in the frame transmission, and the location of the table of contents within the frame. The location of the table of contents that are identified in the frame header can occur in varied locations within the transmission sequence as designated by the frame header. The TOC locations definition creates a variable-sized structure with the frame. The TOC locations may be maintained as a list or an array. Each element in the list or array includes a reference (e.g., an index) to a logical packet where a table of contents may be found in the transmitted frame. The TOC locations definition may also include a format type, error correction mode, and error correction setting for the TOC. An example format type is a class descriptor that is associated with capabilities of devices by type such as PDA, Pocket PC, XBOX, etc. Another example format type is a class descriptor that is associated with device capabilities by protocol version number.

Table of Contents (TOC)

Each table of contents identifies shared data streams that will occur in the next frame transmission. The client device schedules the reception of shared data streams based on prioritization. Since many client devices have limited resources, the prioritization may be determined by user interaction or by a predetermined selection associated with the subscription to the broadcasted service.

Each TOC packet is located at a particular logical packet as described in the TOC locations definition as previously described. The TOC packet includes a set of flags and TOC range descriptors that are illustrated in FIG. 5. The flags may be 8-bits in extent, while the TOC range descriptors may be an array (or list) of up to 32 entries. The TOC range descriptors are the outermost descriptor for the TOC packet, and simply refer to a collection of range descriptors (e.g., TOC Ranges[ ]). Each TOC range descriptor (e.g., TOC Range0) has an initial position, and TOC slot designators (e.g., TOC slots[ ]). The initial position for the range descriptor may be an 11-bit value that indicates the packet offset of the beginning of the range within the transmitted frame. The TOC slot designators may be an array (or list) that describes the set of slots in the range (e.g., TOC Slot 0:TOC Slot N).

Figure 6:
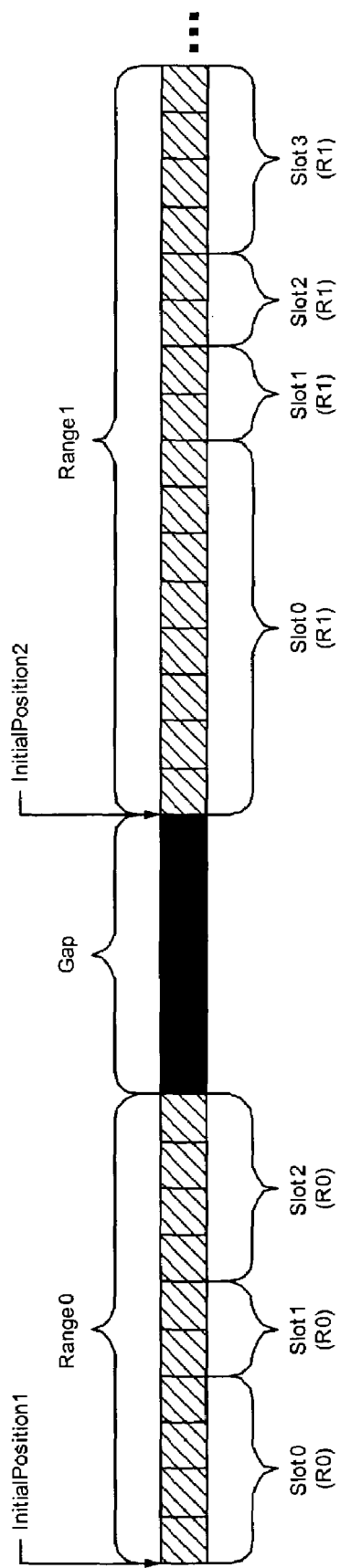
FIG. 6 is a diagram illustrating a TOC range descriptor.

An example of TOC range descriptors within a frame is illustrated in FIG. 6. A stream of data is transmitted over time in a frame. Range 0 is defined by an initial position (position 1) and three slots numbered slots 0 through 2. Slot 0 (R0) includes 4 logical packets, slot 1 (R0) includes two logical packets, and slot 2 (R0) includes four logical packets. Range 1 is received after a gap in the transmission. The transmission gap may be utilized by services other than shared data streams such as private data streams, or some other secondary service. Range 1 is defined by an initial position (position 2) and four slots numbered slots 0 through 3. Slot 0 (R1) includes 8 logical packets, slots 1 and 2 (R1) each include two logical packets, and slot 3 (R1) includes four logical packets. As noted by this example, each range can have a different initial position as designated by the TOC range descriptor, and a different number of associated slots. Each of the slots need not be the same size for every range and can vary in their extent as identified by the TOC slot descriptor for the given range.

The TOC slot descriptors may include the following fields: service ID, stream locator, packet count, error correction setting, and frame reservation. The service ID may designate a specific broadcast service by a 16-bit value indicating a stream type. The stream locator may be a 16-bit opaque value that is used by the application-level data handlers. The packet count may be a 2-bit value that indicates the number of packets contained in the slot. The error correction setting may be a 3-bit value that identifies a type of error correction methodology that is employed by the stream. The frame reservation may be a 3-bit value that indicates how long the scheduler will guarantee that the slot assignment will be valid for the given service ID in terms of number of frames.

Shared Data and Data Handlers

Shared data is associated with data streams that are intended for multiple clients, and associated with a broadcast service. Each client that accesses the shared data must have valid access in the form of encryption keys, appropriate client-side applications, and control data. Shared data is managed through a set of handlers that translate application layer semantics into packet requests and message reassembly.

Applications on the client device are registered with the transport layer. The transport layer maintains the data handlers for each registered application, and retrieves the TOC from the logical packets that are received from the network layer. The transport layer notifies the registered applications that data streams will be available in the next frame transmission as identified with the service ID. Each application program applies a series of metrics to determine priority for the receipt of data streams, which are submitted to the transport layer in the client device. Prioritization is performed independently by each application on the client device based on any criteria such as preferred data, error correction requirements, as well as base and elevated priority levels. The transport layer reviews all of the requests, decides which requests will be accepted, and translates the accepted requests into packet requests to the network layer. The network layer retrieves the relevant packets in the next frame transmission and passes the packets to the relevant registered applications via the data handlers.

A feed corresponds to a complete data stream that is capable of being processed by the corresponding application on the client device, and associated with a particular broadcast service. A shared data stream is arranged in the frame transmission according to a type associated with the feed. The client device includes a data handler for each application that resides within the device such that the data handler is associated with a particular broadcast service. The client device identifies the particular broadcast service based on the service ID that is received from the TOC slot descriptors. Example data handlers that are described below include compact, sparse, and long types. However, the data handlers may be changed and/or additional data handlers can be added without impacting the frame protocol. Each application and matching broadcast service can define behaviors for handling data that is of the particular type as identified by the service ID in the TOC slot descriptor.

Compact data types have a one-to-one relationship between packets and messages such that an entire message is contained in a single packet. The compact data type does not require any header information. The compact data handler uses the stream locator from the TOC slot descriptor to determine a starting location for the first compact message in the slot. Subsequent one-packet messages follow the starting location, offset by one packet at a time. The packet count in the TOC slot descriptor indicates a total number of compact messages that are associated with are broadcast service. An example of a compact message is a stock quote for a stock channel broadcast service. The broadcast service for the stock channel may have a series of subscribed stock quotes (e.g., MSFT, IBM, ORCL, etc.) that are indexed for the application on the client device. For this type of data stream, the stream locator identifies the starting location for the stock quote messages on the stock channel application for the client device. Each subsequent stock quote is a separate message that follows in sequence after the starting location identified by the stream locator.

A sparse data type is a data stream that is distributed over multiple packets. The application on the client device requests data from the transport layer based on information that is retrieved from the TOC (e.g., the service ID). Sparse data may span multiple packets, typically less than six to ensure data integrity and quality of service. Each packet in a sparse data stream is called a fragment, where each message has at least one fragment. The header for each packet is retrieved by the corresponding application on the client device, which identifies the number of fragments to form a complete message and the fragment number of the current packet in the message. The stream locator in the TOC range descriptor indicates the location of the first fragment (or packet) in the sparse data stream. Each individual packet is viewed as an offset from the first packet location.

An example of a sparse data stream message is a news story in a news channel broadcast service. The broadcast service for the news channel may require multiple packets of information to transfer all of the text associated with the news story to the client device. The news story is broken into multiple packets that may not fit in a single transmission frame, where each packet includes a packet (or fragment) number that identifies where in the total data stream the particular packet (or fragment) is located, and a service ID to identify the news stream.

Figure 7:
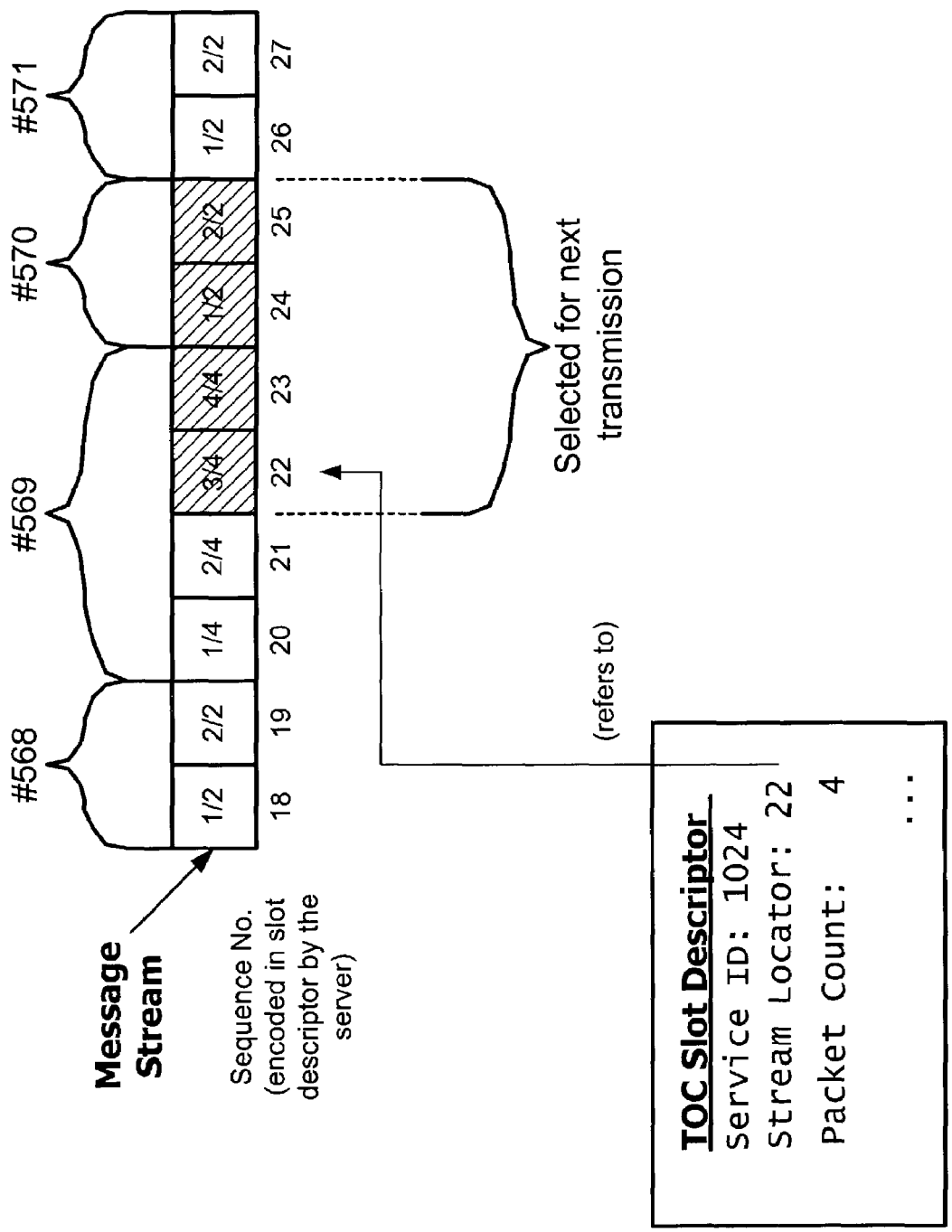
FIG. 7 is a diagram illustrating a TOC slot descriptor.

An example TOC slot descriptor for a sparse data type is illustrated in FIG. 7. The TOC slot descriptor provides the client device with the service ID that is associated with a particular application (service ID), the stream locator within the data stream (stream locator), and the number of packets that follow (packet count). In the example illustrated in FIG. 7, the broadcast server application has been given four packets and has chosen to send the last two fragments of message #569 and both fragments of message #570. It is assumed that the last time this broadcast server application was given four packets, it chose to send #568 and the first half of #569. The client gathers all of the packets of the message before deserializing the content for the application layer.

A long data type is a data stream where a complete message is distributed over a large number of packets, such as transferring a file. Long data types have a one-to-one relationship with service ID and message number. For a long data stream, error correction codes are added to the end of the data stream to ensure data integrity over the communication channel. The stream locator in the TOC slot descriptor is used to represent sequence numbers that extend the range of packets over multiple slots. For instance, a long data stream may need to send 6K worth of data. However, the scheduler process on the server may assign 4 slots in each frame to the long data streams, where each slot includes 8 packets. The long data handler breaks the 6K of data into 8 packet blocks, assigning sequence numbers to each block starting with 0.

Private Data

Data intended for a specific subscriber is considered to be private. Private data may be directed to every device that is identified with the subscriber (e.g., more than one device), or a single subscriber device. Private data is provided as a message that may span multiple packets, with each packet constituting a fragment of the total message. Private data may also be referred to as a private or personal message. Personal messages do not have a service ID, and do not employ a table of contents as was described with respect to shared messages.

Private messages include a header that includes fields for message ID, fragments in message, fragment index, private packets per frame, and data. The server establishes the message ID as a 10-bit value to identify the message and avoid duplicates. Each private message is organized as a number of packets that are identified by a 6-bit value of fragments in message. Each packet is indexed by 6-bit value of the fragment index, indicting where the current packet fits in the total number of packets in the private message. The private packets-per-frame field corresponds to a 2-bit field that indicates how many packets the client should request. The data field is the actual data bytes that are deserialized after all of the fragments have been received for the private message.

In order to prevent unauthorized reception of private messages, private messages are encrypted with an encryption key and each client is assigned a set of locations within the frame where the private messages will be placed. The locations are determined algorithmically using a combination of the subscriber ID (used by all devices belonging to a single subscriber) and the current frame number. A hash function is applied determine the specific locations (e.g., slots) within the frame where the client's private message will be located. The server and the client are both aware of the subscriber ID without communicating any information such that the locations of the private message within the transmission frame are arrived at without any direct interaction.

Private message have a latency that should not exceed a single frame time (e.g., two minutes). Since there will rarely be a case in which a single subscriber doesn't compete for a specific packet location, the server uses escalating priorities to ensure that all subscribers receive data fairly. By jumping around the frame somewhat randomly, the degenerate cases of repeated collisions with higher priority competitors are avoided.

By default, each frame is divided into partitions. The client will request 1 to n packets according to the number of private packets the server has indicated for transmission. Each packet requested will be mapped to a pseudo randomly assigned slot and partition. Each subscriber should have a unique set of slot/partition assignments for each transmission frame so that private messages cannot be reconstructed by an unauthorized client. Partitions can be sized in equal or non-equal amounts. A particular client may have their slot assignments located in one partition, or located in different partitions based on the pseudo-random assignment method.

In one example, slot and partition assignments are determined by the following algorithm:

1) Using the unique ID and the slot index, compute a hash value for partition assignment.

2) Truncate the hash value for the partition assignment by the total number of partitions in the frame transmission to define the initial position for the unique ID.

3) Add the frame number to the truncated hash value so that each device cycles through all the partitions.

4) Pick out the starting and ending position of the partition.

5) Using the unique ID, the frame number, and the slot index, compute a hash value for the slot assignment within the partition.

6) Collapse the hash value for the slot assignment so the collapsed value fits within the size of the selected partition.

7) Add the start position of the partition to the collapsed hash value to determine the packet number for the requested slot.

8) Repeat steps 1 through 7 for indexes 0, 1, 2, and 3.

An example algorithm for partition and slot determination is illustrated below by pseudo code. The algorithm pseudo-randomly selects partitions and slot locations using the unique ID, the frame number, and the number of partitions that are found in the transmission frame. The algorithm is broken into four parts (ComputePacketSlot, Hash, HashArray, and Collapse) as is described below:

```
public ushort ComputePacketSlot(
    byte[] uniqueID,
    uint frame,
    uint index,
    int numOfPartitions,
    ushort[] PartitionStart,
```

-continued

```
    ushort[] PartitionEnd )
{
    uint partition = (Hash( uniqueID, 0xFFFFFFFF, index ) +
frame) % numOfPartitions;
    uint slot = Hash( uniqueID, frame , index );
    ushort selectedPartitionStart = PartitionStart[partition];
    ushort selectedPartitionEnd = PartitionEnd[partition];
    ushort selectedPartitionSize = selectedPartitionStart -
selectedPartitionEnd;
    return (ushort)Collapse( slot, selectedPartitionSize ) +
selectedPartitionStart;
}
static public uint Hash( byte[] data, uint frame, uint slot )
{
    byte[] val = data + frame + slot;
    return HashArray( val );
}
static public uint HashArray( byte[] data)
{
    uint hash = 0;
    int offset = 0;
    int len = data.Length;
    while(len-- > 0)
    {
        hash += data[offset++];
        hash += (hash << 10);
        hash ^= (hash >> 6);
    }
    hash += (hash << 3);
    hash ^= (hash >> 11);
    hash += (hash << 15);
    return hash;
}
static private uint Collapse( uint slot, uint size )
{
    uint res = 0;
    uint rem;
    while(slot != 0)
    {
        rem = slot % size;
        slot /= size;
        res ^= rem;
    }
    return res % size;
}
```

Figure 8:
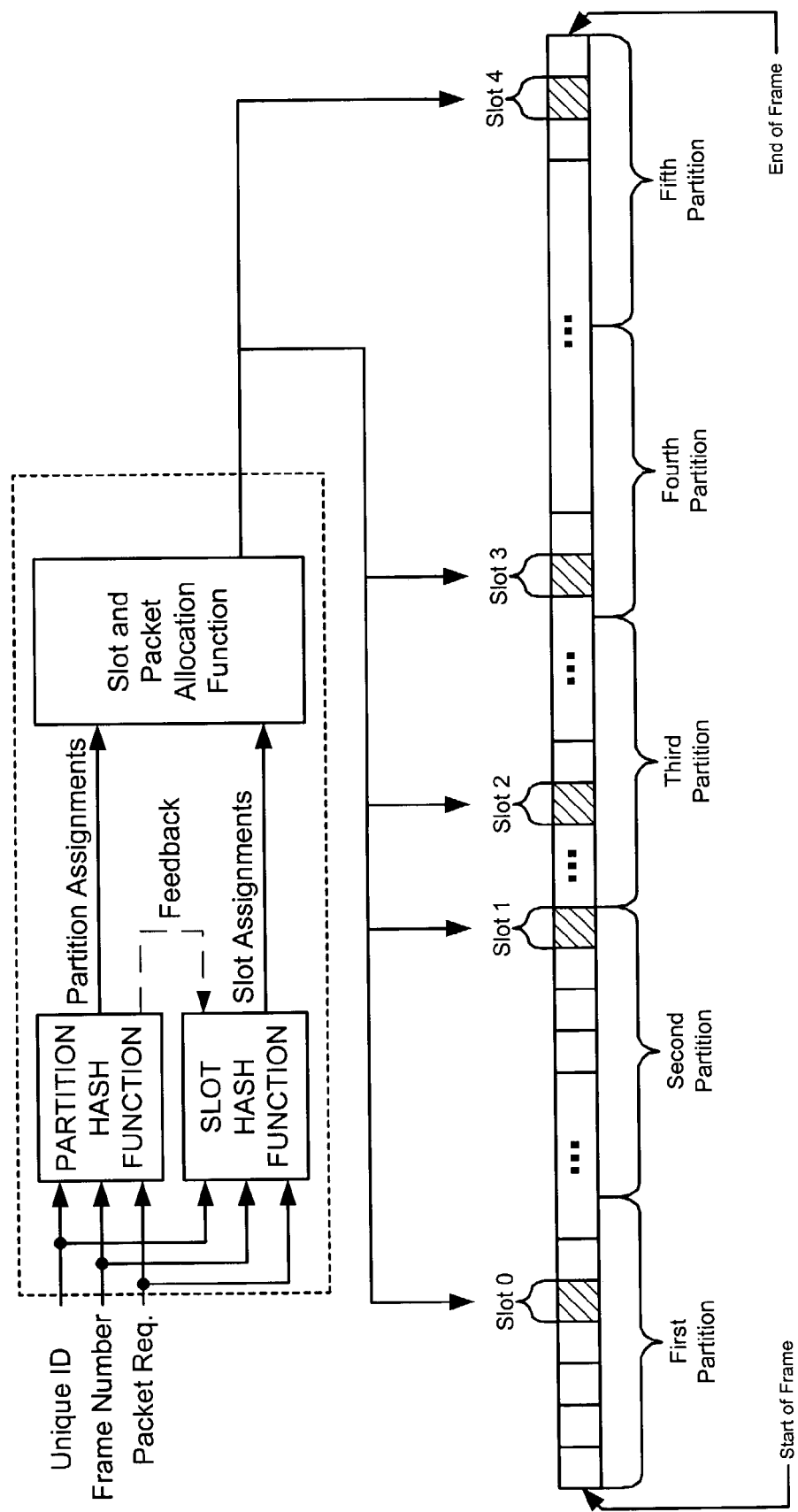
FIG. 8 is a diagram illustrating a private message.

An example of a private message for a particular client is illustrated in FIG. 8. The frame is divided into partitions (e.g., five partitions—equally or non-equally sized). Each private data packet that is associated with a client (or subscriber) is pseudo-randomly assigned to one of the partitions using a first hash function. Each private data packet that is associated with the client (or subscriber) is assigned to a pseudo-randomly selected slot location within the respective partition. The slot location is determined from a second hash function. As illustrated in FIG. 8, slot and partition assignments are determined from the frame number, the unique ID, and the requested number of packets (with one packet per slot).

Each client device has a unique 128-bit key that is referred to as a "device key". The device key is preferably a permanent key that cannot be changed such as laser-burning the chip at the factory so that it cannot be changed. The device key is used to encrypt the activation message. The device key is also used for encrypting messages addressed to a particular client device (as opposed to all devices that are registered to the same subscriber).

Each subscriber has a unique 128-bit key that is referred to as a "subscription key" (or "control key"). The subscription key is generated when a user subscribes to a private messaging service. During the device activation, the subscription key is sent to the client device encrypted with the device key. All subsequent personal messages for the subscriber are encrypted using the subscription key.

Each broadcast service has a unique 128-bit key that is referred to as a "service key". All broadcast messages are encrypted with the service key. For simplicity of configuration and usage, services are grouped in tiers. All services in a tier share the same encryption key. When a user subscribes to a service, he receives the key as a personal message, encrypted with the subscription key. The service key can be changed periodically such as once for each billing period so that only those users that have paid for the service receive the service key.

A special algorithm is used to derive a value from a key. The algorithm consists in encrypting a known string (e.g., "hello world") with the key and extracting the number of required bits. This derived value is named "key signature" and is used for multiple purposes, as will be described below.

The signature of the device key is used as a device identifier. The user types this identifier to the web site when registering a device. The key generation process ensures that only keys with unique signatures are used. The signature of the device key is used as a seed for computing the slot position of the activation messages in the frame (that happens before the device has been activated—it didn't yet receive the subscription key).

The signature of the device key is also used as a seed for computing the activation station for this device. In one example, the unique identifier corresponds to a unique serial number that is associated with the client device. An example unique code may be a 128-bit code, where 32-bits of the unique code are used as an offset amount to determine tower assignment from the list of available towers in the service region. For example, offset=N modulo n, where N corresponds to the 32-bits from the unique code, and where n is the number of stations that are available in the service region.

The signature of the subscription key (the signature ID, or unique ID) is used as a seed for computing the slot position of the personal messages in the frame after activation has been received. The signature of the subscription key is also used as a seed for computing the assigned station for this device (where the device listens for personal messages).

The broadcast server is arranged to encode private messages for transmission to a particular client with a similar method as described above. The broadcast server is aware of the unique control keys for every client device. Each personal message is encoded according to the unique control keys and the unique identifier for the client device. The packet encryption algorithm uses two values. One is fixed (the key) and the other is variable (the initialization vector or "IV"). The IVs are computed using the frame and packet number. Since the frame number is guaranteed to increase for every frame, the IV will always be different. In one example, the broadcast server computes a 128-bit code that is identical to the 128-bit code that is computed by the client device. Auto assignment of the broadcast tower and personal messages channels are determined using the above-described self-assignment procedure.

The default mode for retrieving personal messages is to attempt to get four (4) packets per frame. This is a costly operation on battery life, but reduces the latency in key scenarios, such as sign-up or device reset. The private packets per frame field in each private data packet can be used by the server to indicate how many packets the client should attempt to retrieve in subsequent frames. It is recognized that this isn't a guarantee that the server will actually populate as many packets or that a client will successfully receive as many packets; rather, it is taken as more of a hint.

Packets are encrypted for each client based on the various keys described above. In one example, the encryption is accomplished by computing a hash using a subscriber key that corresponds to the client (or subscriber). The hash is included in the packet transmission. The client device ignores the private message packet when the hash that is transmitted in the private message packet does not match the hash that is computed by the client device. In order to properly interpret private messages, it is required that the private message payload is encrypted with the client's key (the subscriber key). The pseudo-random slot and partition assignments, along with the encryption, prevent unauthorized receipt of private messages. The hash may be computed using Davies-Meyer, MD5, SHA1, or any other appropriate hashing procedure.

Control Data

Client devices are not able to retrieve broadcast services until the applications on the client device are registered for use. As stated previously, a set of encryption keys, applications, and handlers are present on the client device to enable proper operation. Initially, the client device is able to retrieve minimal information in the form of control data or messages. Control messages provide a means to communicate operational information to the client.

Activation and deactivation control messages may be used to retrieve encryption keys for each subscription service, or to cancel subscriptions from the client device. Home region assignment is communicated to the client device in the form of a control message, as well as default broadcast channel assignments.

Broadcast Server Frame Scheduling

As described previously with respect to FIGS. 4A through 4D, the broadcast server is arranged to select data for transmission in each frame. The selection of data for a given transmission frame is determined based on priority levels that are assigned by each broadcast service, and quality of service metrics that are applied by the frame scheduler.

The scheduler balances the load on traffic with priority scheduling such that the transmission bandwidth is fully utilized. Data streams may be of differing data types such as private data, shared data, and control data. Private data are directed to single user, while shared data is broadcast to groups of client devices as previously described. Control data may be are communicated to single or groups of client devices, and communicate bookkeeping and configuration information.

The scheduler is a distributed model, where portions of the scheduling function are provided by handlers for the shared service, private message service, and table-of-contents (TOC) manager. The scheduler assigns packets to slots based in the next frame transmission based on a priority algorithm, as will be described with reference to FIG. 9.

Shared data and private data service handlers are registered with the TOC manager, which is in turn registered with the scheduler. Prior to assembling a transmission frame, the scheduler submits a request to generate slots to the TOC manager (Generate Slots). The TOC Manager will update information to reflect the last transmission sequence (Review Slots). The review of slot assignments is described in further detail below.

Slots assignments are maintained for a number of transmission sequences so that client devices can rely on the designated slot locations for the particular information. The frame reservation field of the slot descriptor designates the number of transmission sequences for which the slot designation will persist. The TOC manager will decrement the frame reservation field of each slot descriptor after the transmission sequence was completed. All slots that have a corresponding frame reservation field with a value of zero are reclaimed by the TOC manager as available. However, the persistent slot assignment can be overridden by an private message as will be described in further detail later.

After the slot assignments are reviewed, and available slots are reclaimed, the TOC manager submits a request (Req. Update Slots) to the registered shared data service handlers to update slots. The shared data service handler processes the request such that the locator fields for the assigned slot descriptors are updated (Update Locators). The TOC slot descriptor field associated with the assigned slot is updated to reflect the changes in the locator fields, and returned to the TOC manager.

An example locator update will be described below with reference to FIG. 7. Messages #568-#570 are associated with a shared message service as identified by service ID 1024. The complete message for message #568 includes two packets. The complete message for message #569 includes four packets. The complete message for message #570 includes two packets. A prior needs request (see discussion below) resulted in a slot assignment to the service identified by service ID 1024 of four packets in length (packet count=4). The TOC slot descriptor in a first transmission sequence includes a first service ID of one thousand twenty-four (1024), a first stream locator of eighteen (18), and a first packet count of four (4). After the first transmission sequence, the shared service handler updates the TOC slot descriptor such that the TOC slot descriptor in a second transmission sequence includes a second service ID of one thousand twenty-four (1024), a second stream locator of twenty-two (22), and a second packet count of four (4). Message #569 is an example of a shared data stream that is split into two fragments (two separate transmissions).

After the TOC slot descriptors are updated, the TOC manager submits a message requesting for needs (Req. Needs) from the registered shared data service handlers. The shared data service handlers review the transmission history associated with the shared data service and determined a requested number of slots and packets for the next transmission frame. The shared data service handler also prioritizes its own needs request, and determines a needs request for the next frame transmission. The request for needs includes a requested priority, and a desired number of packets associated with the slot (e.g., 1, 2, 4, 8, 16 packets for the slot). As discussed previously, each application or shared data service is free to determine its own priority for the transmission of messages. The needs request (Needs) is provided to the TOC manager.

Next, the TOC manager requests for overrides (Req. Override) from the private data service handlers. Each private data service handler determines its needs for the next frame transmission. Private data service handlers determine the slot assignment based on a pseudo-random assignment method that was described previously. The private data service handler will request to reserve a number of private data packet slots in the next transmission frame. In some instances, the message will be of an urgent manner that requires immediate transmission, or the private message has been waiting for a long time without being transmitted. In this instance, the private data service handler may demand the message is sent in the next transmission frame by making an override request to the TOC manager, indicating that the private data message must be sent in the next frame transmission.

The TOC manager reviews all of the needs requests from the shared data service handlers and all of the override requests from the private data service handlers. After review all of the requests, the TOC manager allocates slots for assignment for shared data in the next frame transmission. The slot allocations are loosely based on the priority levels requested by the service handlers, and adjusted by the scheduler based on quality of service as well as other metrics. After the slot allocation is completed, the TOC manager sends a message to the shared data service handler (Req. Generate Packets), requesting packets for the allocated shared data slots in the next frame transmission.

In response to the request to generate packets, the shared data service handler fills the assigned slots (Fill Slots) with the packets that are identified by the TOC slot descriptors. The packets are encrypted by the shared service handler such that only those client devices that subscribe to the particular broadcast service can successfully decrypt the messages. After all of the slots that are allocated to shared service have been filled, the TOC manager reserves the packets for the next transmission frame and updates the TOC for the current frame. As stated previously, the TOC is a forward-looking index that identifies the shared data that will be available in the next frame transmission. The TOC manager returns the filled shared-data slots to the scheduler, along with the table of contents for the current transmission frame.

The scheduler sends a message to the private data message handler to request private data packets (Req. Generate Private Packets). The private data message handler provides private message packets to the designated slots (as previously determined using the pseudo-random assignment method). The scheduler then completes the assembly of the frame, and provides the completed frame to the broadcast server for transmission.

Since private data is added to the unused slots after the shared data, it is possible that private data is repeatedly scheduled out of the next frame transmission. The Override feature helps prevent the private data streams from being preempted by aggressively allocating a slot assignment away from a sticky slot assignment from a shared data stream. Two types of slot assignments may be made as the result of an override (early and late slot override). An early slot override results when a slot override request is received prior to assembling the TOC such that the slot assignment is preempted by the private message override (before the slot was allocated to the shared data service). A late slot override results when a slot override request is received after a TOC that allocates the slot has already been transmitted.

As described previously, a TOC slot descriptor includes a frame reservation field that designates a number of successive frame transmissions that are associated with a particular shared data service. The frame reservation filed forms a contract between the scheduler and the shared data service. The late slot override violates the contract since the slot should not normally be allocated to any other service until the slot becomes available again later. The TOC is not updated to identify the override. Since private data is transmitted in an encrypted format, the TOC indexed slot will be ignored by the improper client device, and accepted by the intended client device that has the proper decryption key.

Figure 9:
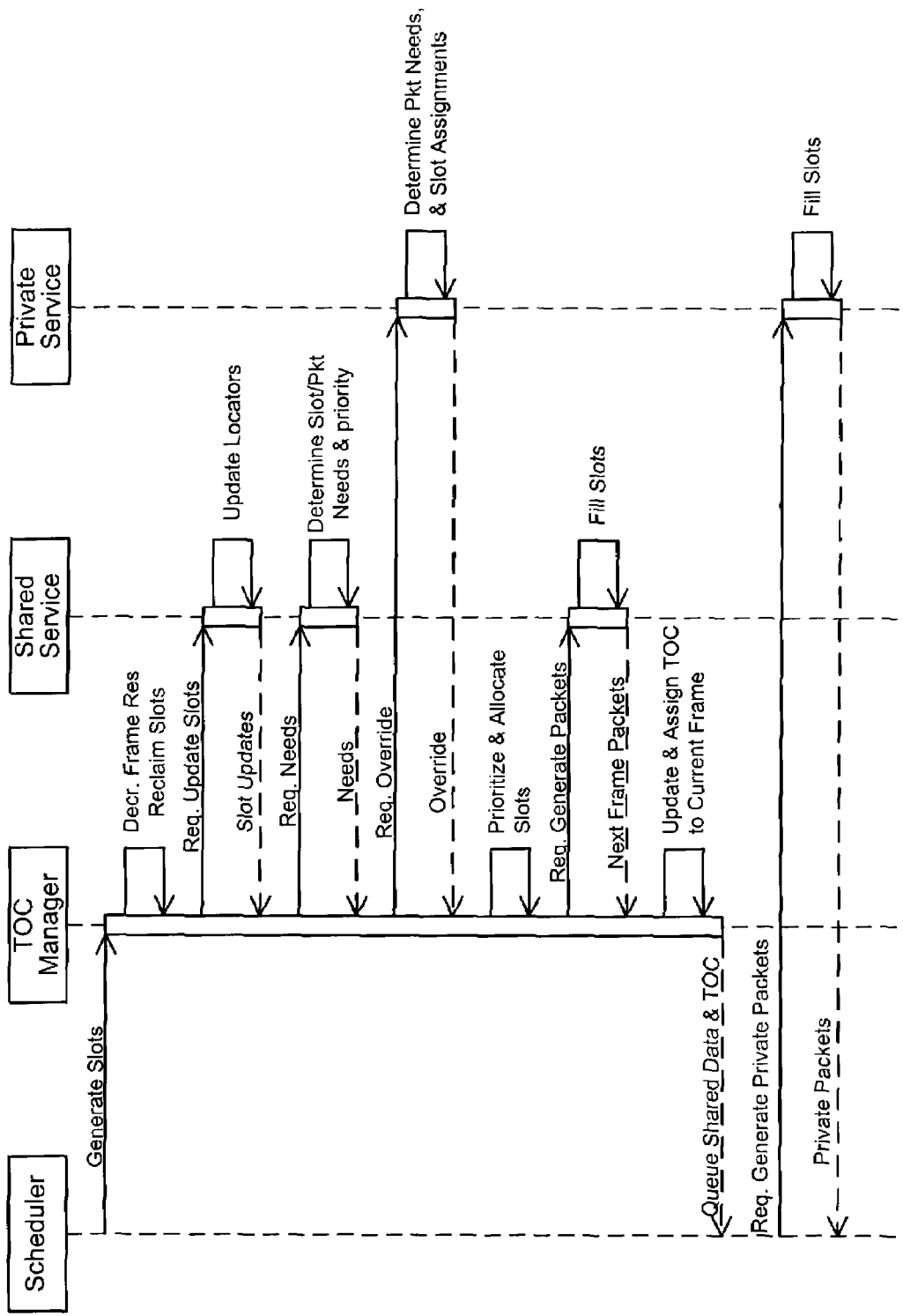
FIG. 9 is a diagram of process flow for server-side frame scheduling.

As noted by FIG. 9, each service that is registered with the TOC manager can determine its own prioritization. Since multiple services are in contention for slots in the next transmission frame, the TOC manager ultimately decides which services are allocated a slot in the next frame transmission.

Priority weighting for streams is determined using a variety of parameters to maximize the use of the available bandwidth and to provide adequate quality of service to client devices. The criteria that is used to determine the priority of a particular service includes: data expiration times, timestamp, length of the service queue, the number of subscribers to a service, quality of service, preference for pre-assigned slots, maximum number of slots retrievable by a client device in a frame, and other rules as may be necessary to provide a pleasurable user experience.

Data expiration times may be associated with a particular service, where the data becomes stale after some time period. Examples of time sensitive services include: stock reports, traffic reports, weather bulletins, headline news, and horoscopes. A stock quotation will only be valid for a few minutes during trading hours, but will be valid for an entire day while the stock exchange is closed. Traffic information may only be useful for up to a half-hour. Headline news may be valid for several hours, while a horoscope is valid for an entire day. Priority for time sensitive data types is higher than those that are less time sensitive.

Timestamps are linked to the data expiration time and to the number of retransmissions associated with a message. Services that have the fewest numbers of transmissions will have increased priority as the data expiration time approaches.

A long message may not be retrievable by a client device in a single transmission, requiring multiple transmissions to complete the communication. By assigning the long transmission sequence a higher priority, the long message will be cleared out of the queue in a few (or more) successive transmissions. Otherwise, the long transmission sequence may be broken up over a very long time frame. Variable data flows are handled using the length of service queue.

The number of subscribers that subscribe to a service is also related to the priority. For example, a service that has a very high number of subscribers will have a higher priority than services with very few subscribers.

Quality of service requires that every service have a time slot in which messages are transmitted. For example, a service with a very low number of subscribers may repeatedly be pushed back in time such that it is transmitted too infrequently. Such a low popularity service must be able to have a time slot to send a minimum number of packets to maintain a high quality of service.

Some client devices will have limited memory, and hence only be able to receive a limited number of message packets. The scheduler should not send excessive message packets for each service since the client device cannot retrieve all the packets. Priorities are allocated to the message packets such that groups of message packets are sent in client retrievable quantities.

The scheduler prefers to maintain sticky assignments with each service so that client devices that lose a table of contents can attempt to receive messages from the last known slot assignments. However, sticky assignments can be overridden by a high priority message. The frame reservation field in the TOC slot descriptors that were previously described reflects sticky assignments.

Each service type has a priority level that is assigned according to a weighting function (Ps). For example, service (S) has a priority level ($P_S$) that is given by: $P_S = f(V_S, W_S)$, where $V_S$ is the set of values for the criteria of service S, and $W_S$ is the set of weights assigned to the criteria. The scheduler can adjust the weighting values for each service to provide a maximum quality of service. An example weighting function is given as:

$$P_S = \sum_i (V_{S_i} \times W_i).$$

Client Transport Layer Processing

Figure 10:
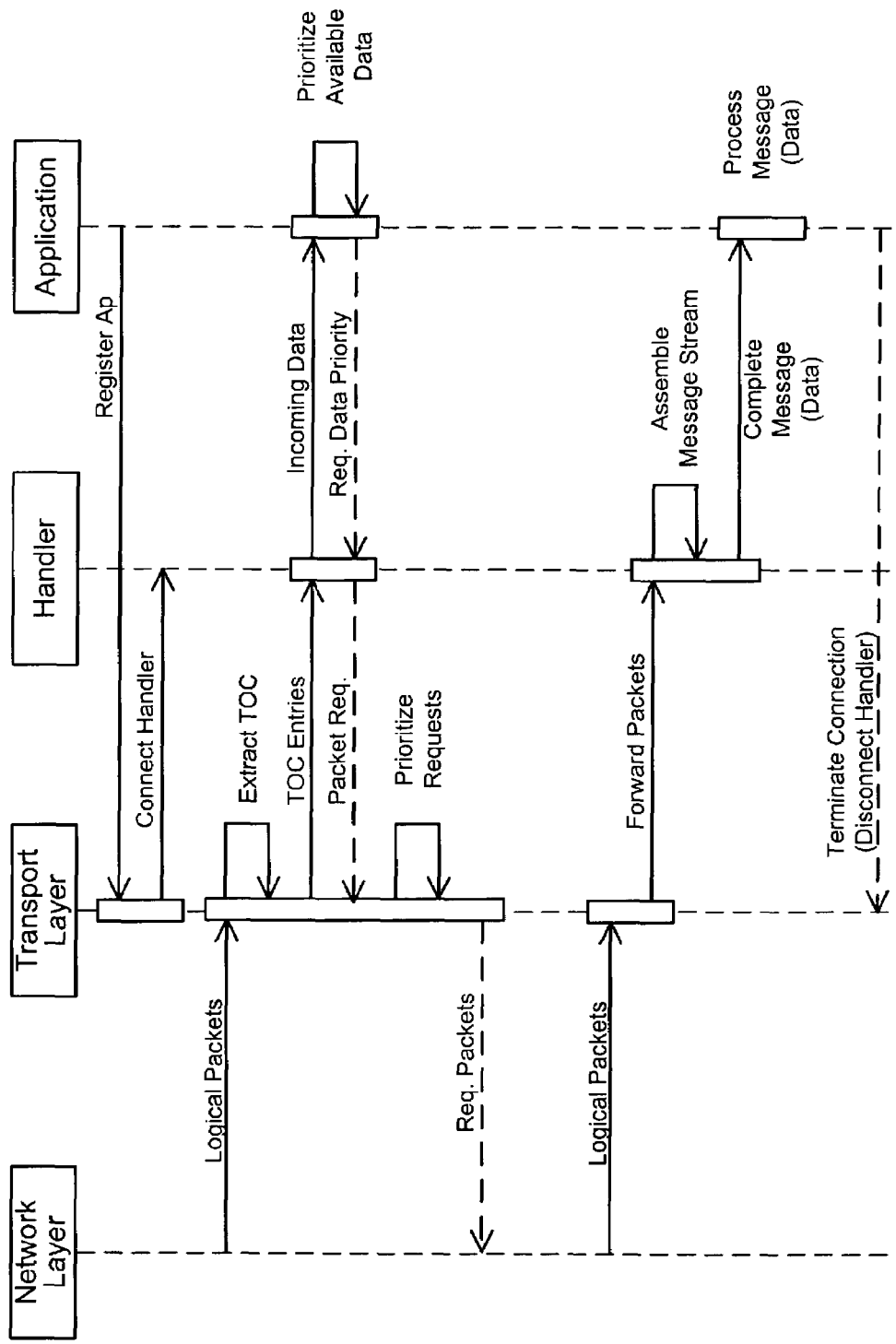
FIG. 10 is a diagram of process flow for client-side transport layer processing.

Client transport layer processing is described below with reference to FIG. 10. As described previously, the client device is only capable of receiving a limited amount of information at any given time. The client device has a series of resident applications that are in contention for data streams from the network. Each application is free to define the formatting of packets associated with that application. The transport layer is unaware of the semantics that are required by the application, and instead is only concerned with the receipt and disbursement of logical packets from the network layer. However, since multiple applications are in contention for packets, the transport layer must prioritize the requests for data from each application.

Applications register with the transport layer such that a handler for the application is active (or connected). The transport layer receives logical packets from the network layer. The transport layer will extract the frame header to find the location of the table of contents relative to the logical packets.

A table of contents is extracted from the logical packets, and notifications are made to the registered applications about the available packets that will be found in the next frame transmission. The registered applications then determine their own priority level associated with a data request from the network based on their own metrics. The registered applications send prioritized data request to the transport layer through the corresponding handler. The transport layer receives all of the priority requests and decides which packets will be retrieved from the next frame transmission. Additional table of contents may be retrieved until the transport layer has sufficient requests to fully utilize the client devices reception capabilities, or until the end of the transmission frame is received. The transport layer then makes packet requests to the network layer.

As described previously, the client device will schedule the reception of shared data streams based on prioritization. Since many client devices have limited resources (e.g., limited memory), it may not be possible to receive all possible data requests in the same frame transmission. Client devices prioritize requests based on user interactions and/or by a predetermined selection associated with the subscription to the broadcasted service. In one example, a client device may be configured by the user to monitor stock prices on one channel, and some other lower priority content on another channel (e.g., daily astrology). Stock prices change rapidly during business hours for the exchange. Since stock reports are time-sensitive (stock prices change rapidly), the stock channel may have an increased priority level during the business hours of the exchange, and lower priority after the close of business at the exchange.

In the next frame transmission, the logical packets are forwarded from the network layer to the application handler, which assembles the message stream. In one example, the handler identifies a completed message and forwards the completed message to the application for further processing. In another example, the handler identifies that the message has not been completed for an excessive amount of time, and the message is discarded as invalid. The application receives messages and processes the messages as required. Some messages require processing because of encryption, or formatting that is designated by the particular needs of the matching broadcast service.

An example message transmission was previously described with respect to FIG. 7. In a first example frame transmission, the application that is matched to service ID 1024 receives a compact message #568. For this example, no additional processing is required by the handler since the entire message is received in a single slot of the transmission frame. In a second example frame transmission, the application that is matched to service ID 1024 receives a fragment of message #569 that is identified with stream locator 22 and 23. The handler recognizes that the particular packets received are associated with logical packets 3 and 4 of a 4-packet transmission. The application will request receipt of packets 1 and 2 in the next frame transmission. In one example, the second fragment of the message is received and the complete message is assembled by the handler and forwarded to the application. In another example, the second fragment is not received in a timely manner; the message becomes stale, and incomplete message is discarded.

The transport layer acts as a scheduler that balances the available data streams with the prioritized requests that are made by each application. Thus, client based scheduling is distributed across both the server side and the client side. The server side determines the frequency of transmissions of subscriber services, private messages, and control data, while the client side determines which of the available datum to retrieve. Since private message packets are headerless and not reference by a table of contents, private messages packets are transferred from the network layer to the application layer.

Collision Detection

Collisions for personal messages are avoided by means of the pseudo random slot assignment methodology that was previously described. However, it is possible for errors to occur in the frame transmission, as well as other problems that result in collisions. In one example, a late slot assignment to a personal message overrides a table of contents entry for broadcast data. For this example, the client retrieves a packet corresponding to the slot assignment identified in the table of contents and detects the received packet as a collision. The broadcast data packet from that particular slot is discarded (or ignored) since it cannot be decrypted without errors.

Figure 11:
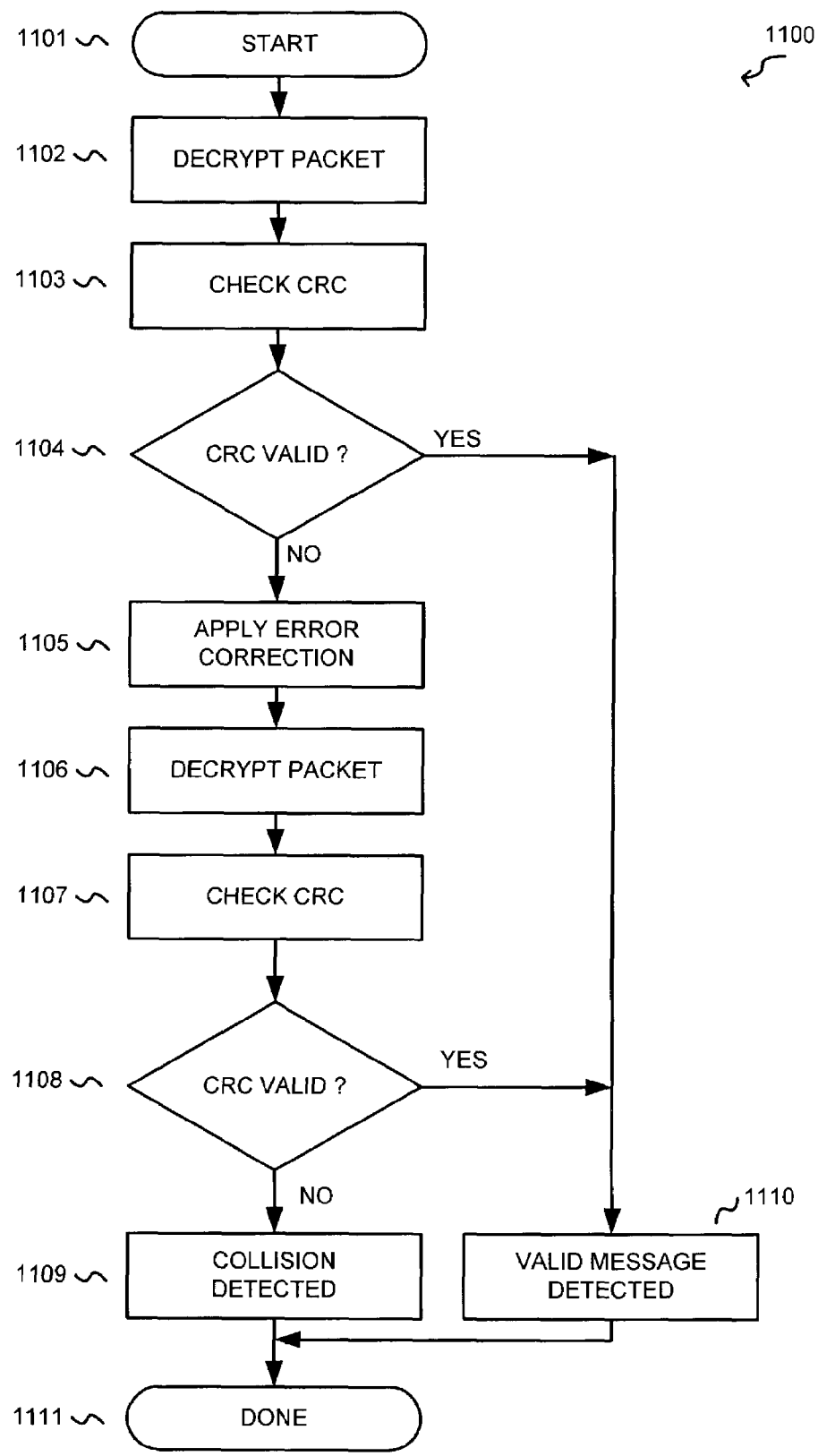
FIG. 11 is a process flow diagram for an example collision detection procedure, arranged in accordance with the present invention.

FIG. 11 is a process flow diagram for an example collision detection procedure, arranged in accordance with the present invention. Processing begins at block 1101 and proceeds to block 1102.

At block 1102, a decryption process is applied to the received packet. The decryption process may be any appropriate decryption method. In one example, messages are encrypted with an encryption key, where the client has a matching key for decrypting. Processing continues from block 1102 to block 1103 where the client device applies a CRC verification process to the decrypted packet. Continuing to decision block 1104, the client device evaluates the result of the CRC verification. Processing continues from decision block 1104 to block 1110 when the CRC is valid. Alternatively, processing continues from decision block 1104 to block 1105 when the CRC is invalid.

At block 1105, an error correction methodology is applied to the packet. The error-correction may be any reasonable error-correction methodology. One example error-correction methodology is Reed-Solomon. Processing continues from block 1105 to block 1106 where the client device decrypts the error-corrected packet. Continuing to block 1107, the client device applies the CRC verification process to the error-corrected decrypted packet. Continuing to decision block 1108, the client device evaluates the result of the CRC verification. Processing continues from decision block 1108 to block 1110 when the CRC is valid. Alternatively, processing continues from decision block 1108 to block 1109 when the CRC is invalid.

At block 1109, the client device has identified that the received packet is identified as a collision. The invalid packet may be the result of noise in the environment that has corrupted a packet, an invalid packet transmission, or a packet slot assignment that does not match the table-of-contents from the prior transmission. The slot may have been assigned to a different client device that has a different decryption key. In one example, the slot assignment was a late slot override as was previously described.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A tangible computer-readable storage memory device having computer executable instructions stored thereon for formatting a data structure for use in communicating transmission frames from a server device to a client device, comprising:
   a frame header packet that is located in a predetermined slot of a current transmission frame, wherein the frame header packet includes a table of contents locations definition field;
   a table of content packet that is located in a flexible slot location of the current transmission frame, wherein the flexible slot location is determined by an entry in the table of contents locations definition field of the frame header packet, wherein the table of contents packet identifies shared data streams that are located in a subsequent transmission frame; and
   a packet that is located in another flexible slot location of the current transmission frame, wherein the packet is associated with an entry in another table of contents packet from a previous transmission frame, wherein each table of contents packet is a forward-looking index that indexes packets in subsequent transmission frames.

2. The tangible computer-readable storage memory device of claim 1, wherein each transmission frame includes 20,480 segments that are broken into 16 segment groups of 1280 segments, wherein each segment includes 68 symbols, and wherein each frame maps into 1280 logical packets that are identified by a slot in the transmission frame.

3. The tangible computer-readable storage memory device of claim 1, wherein the frame header packet is located in the first slot of the transmission frame.

4. The tangible computer-readable storage memory device of claim 1, wherein each frame header further includes fields for a frame number, a time stamp, a time zone offset, and a broadcast region definition.

5. The tangible computer-readable storage memory device of claim 1, wherein the frame header packet further comprises a frame number field that has an associated value that is different from values associated with the corresponding frame number fields of previous and subsequent transmission frames such that replay attacks are detected by client devices.

6. The tangible computer-readable storage memory device of claim 1, wherein the frame header packet further comprises: a time stamp field that designates the time for the beginning of the frame transmission.

7. The tangible computer-readable storage memory device of claim 1, wherein the frame header packet further comprises: a time zone offset field that indicates a time zone for the geographic region of each frame transmission.

8. The tangible computer-readable storage memory device of claim 1, wherein the frame header packet further includes fields for a time stamp and a frame number, wherein the time stamp and the frame number are used to encrypt packets in the transmission frame such that client devices authenticate the frame header and ignore transmission frames that correspond to variation replay attacks.

9. The tangible computer-readable storage memory device of claim 8, wherein the encrypted packets are encrypted with an encryption key and an initialization vector, wherein the initialization vector is determined by the values from either the frame number field or the time stamp field.

10. The tangible computer-readable storage memory device of claim 1, wherein each table of contents locations definition field identifies a slot location, a format type, an error correction mode, and an error correction setting for a corresponding table of contents.

11. The tangible computer-readable storage memory device of claim 1, wherein each table of contents locations definition field further comprises: indexes to tables of contents packets, wherein each index includes a slot location and a format type, wherein the slot location identifies a location for the table of contents packet within the transmission frame, and the format type identifies a particular class of client device.

12. The tangible computer-readable storage memory device of claim 1, wherein each table of contents packet further comprises: a set of range descriptors, wherein each particular range descriptor includes fields for an initial position and a number of slots that are associated with a particular range.

13. The tangible computer-readable storage memory device of claim 12, wherein the initial position corresponds to a packet number that is associated with the beginning of the particular range in the transmission frame.

14. The tangible computer-readable storage memory device of claim 12, wherein each slot that is associated with the particular range has a corresponding slot descriptor that includes fields for a service ID, a packet count, a stream locator, an error correction setting, and a frame reservation.

15. The tangible computer-readable storage memory device of claim 12, wherein each slot that is associated with the particular range has a corresponding slot descriptor that includes a service ID field, wherein each service ID field identifies a particular broadcast service that is associated with the slot such that logical packets associated with the slot descriptor are also associated with the particular broadcast service.

16. The tangible computer-readable storage memory device of claim 15, wherein the particular broadcast service is associated with a data type, wherein each logical packet is formatted according to the data type for use by an application program that is also associated with the particular broadcast service on a client device.

17. The tangible computer-readable storage memory device of claim 16, wherein the data type corresponds to one of a compact data type, a sparse data type, and a long data type.

18. The tangible computer-readable storage memory device of claim 12, wherein each particular slot that is associated with the particular range has a corresponding slot descriptor, wherein the slot descriptor includes a packet count field that identifies a number of packets that are associated with the particular slot in the frame transmission.

19. The tangible computer-readable storage memory device of claim 12, wherein each particular slot that is associated with the particular range has a corresponding slot descriptor, wherein the slot descriptor includes a stream locator field that identifies an opaque value that is used by the application-level data handlers that are associated with a particular broadcast service.

20. The tangible computer-readable storage memory device of claim 12, wherein each slot that is associated with a range descriptor has a corresponding slot descriptor, wherein the slot descriptor includes a service ID field and a frame reservation field, wherein the service ID field identifies the broadcast service that is associated with the particular slot in the frame transmission, and wherein the frame reservation field indicates a number of frame transmissions for which the slot is assigned to the broadcast service.

21. The tangible computer-readable storage memory device of claim 1, wherein the transmission frame is divided into five partitions, a pseudo-randomly assigned slot in each of the five partitions is assigned to a client for each transmission, and wherein the transmission frame includes a portion or all of a private message for the client in one or more of the pseudo randomly assigned slots.

22. The tangible computer-readable storage memory device of claim 21, wherein the pseudo-randomly assigned slots are determined from at least one member of a group comprising a subscriber ID that is associated with the client, a current frame number, and a hash function.

23. The tangible computer-readable storage memory device of claim 21, wherein the private message spans a number of logical packets that each includes a private message header, wherein the private message header includes fields for message ID, fragments in message, and fragment index, wherein the private message is identified by the message ID field, the number of logical packets is identified by the fragments in message field, and each logical packet is identified by the fragment index.

24. A tangible computer-readable storage memory device having computer executable instructions stored thereon for formatting a data structure for use in communicating transmission frames from a server device to a client device, comprising:
a frame header packet that is located in a predetermined slot of a current transmission frame, wherein the frame header packet includes a table of contents locations definition field; and wherein the frame header packet further comprises: a region definition field that includes a region ID, a code name, and a list of frequencies, wherein the region ID identifies the current broadcast region, the code name provides a description of the current broadcast region, and the list of frequencies corresponds to radio frequencies that are available in the current broadcast region;
a table of content packet that is located in a flexible slot location of the current transmission frame, wherein the flexible slot location is determined by an entry in the table of contents locations definition field of the frame header packet, wherein the table of contents packet identifies shared data streams that are located in a subsequent transmission frame; and
a packet that is located in another flexible slot location of the current transmission frame, wherein the packet is associated with an entry in another table of contents packet from a previous transmission frame, wherein each table of contents packet is a forward-looking index that indexes packets in subsequent transmission frames.

25. A tangible computer-readable storage memory device having a computer executable program stored thereon for formatting a data structure for use in communicating transmission frames from a server device to a client, comprising: logical packets that are identified with a corresponding slot in the transmission frame, wherein the logical packets are divided into partitions, wherein the client is pseudo-randomly assigned to slots, wherein each slot is pseudo-randomly assigned to the partitions, and wherein a logical packet that is associated with one of the pseudo-randomly assigned slots includes a portion or all of a private message for the client; wherein the packets include a frame header packet that is located in a predetermined slot, wherein the frame header packet includes a table of contents locations definition field, and wherein the packets include a table of contents packet that is located in a flexible slot location, wherein the flexible slot location is determined by an entry in the table of contents locations definition field.

26. The tangible computer-readable storage memory device of claim 25, wherein each transmission frame includes 20,480 segments that are broken into 16 segment groups of 1280 segments, wherein each segment includes 68 symbols, and wherein each frame maps into the 1280 logical packets.

27. The tangible computer-readable storage memory device of claim 25, wherein the pseudo-randomly assigned slots are determined from at least one member of a group comprising a subscriber ID that is associated with the client, a current frame number that is associated with a transmission frame, and a hash function.

28. The tangible computer-readable storage memory device of claim 25, wherein the private message spans a number of logical packets that each include a private message header, wherein the private message header includes fields for message ID, fragments in message, and fragment index, wherein the private message is identified by the message ID field, the number of logical packets is identified by the fragments in message field, and each logical packet is identified by the fragment index.

29. The tangible computer-readable storage memory device of claim 25, wherein the pseudo-random slot assignments is determined by: concatenating a subscriber ID with the current frame number to form an array, creating a hash value from the array, and limiting the hash value to a size that is associated with each partition.

30. The tangible computer-readable storage memory device of claim 29, wherein the current frame number is different for each subsequent transmission frame such that the slot locations that are assigned to each client changes for each subsequent transmission frame.

31. The tangible computer-readable storage memory device of claim 25, wherein logical packets that are associated with a private message are encrypted with an encryption string and a unique control key.

32. The tangible computer-readable storage memory device of claim 31, wherein a unique identifier that is associated with the client is determined by the unique control key.

33. A method for scheduling frame transmissions from a server to a client device, comprising:
using a processor, sending a request to a shared data service handler for needs, wherein the shared data service handler is associated with a registered broadcast service;
using the processor, receiving needs from the shared data service handler in response to the request, wherein each need requested by the shared data service handler includes a requested priority level and a requested allocation of packets for a transmission slot;
using the processor, prioritizing the needs that are received from the shared data service handler;
using the processor, allocating slots for the next transmission frame based on the prioritized needs;
using the processor, creating a table of contents for the next transmission based on the allocated slots;
requesting packets from the shared data service handler for the current transmission frame;

receiving packets from the shared data service handler for the current transmission frame, wherein the received packets are associated with a previous table of contents from a previous transmission frame;

assigning the table of contents for the next transmission to an unused slot in the current transmission frame;

assembling packets in the current transmission frame according to previous slot allocations from a previous table of contents, and the assigned slot for the table of contents for the next transmission frame; and assembling a frame header for the current transmission frame, wherein the header frame references the location for the table of contents in the current transmission frame.

34. The method of claim 33, further comprising: overriding an allocated slot assignment for a private message packet.

35. The method of claim 33, further comprising: determining a pseudo-random slot assignment within a pseudo-randomly assigned partition for each private message slot, prioritizing private message slot assignments, and assigning unused slots to the private message slots on the prioritization.

36. The method of claim 35, wherein the pseudo-random slot and partition assignments are determined by a hash that employs a unique ID, the frame number, and the packet number of the private message.

37. The method of claim 35, wherein determining a pseudo-random slot assignment with a pseudo-randomly assigned partition includes:

computing a hash value for partition assignment using the unique ID and the slot index;

truncating the hash value for the partition assignment by the total number of partitions in the frame transmission to define the initial position for the unique ID;

adding the frame number to the truncated hash value so that each client cycles through all the partitions;

determining the starting and ending position of the partition;

computing a hash value for slot assignment using the unique ID, the frame number, and the slot index;

collapsing the hash value for the slot assignment so the collapsed value fits within the size of the selected partition; and adding the start position of the partition to the collapsed hash value to determine the packet number for the requested slot.

38. The method of claim 35, encrypting packets associated with the private message, wherein an encryption process uses either a frame number or a packet number to determine an initialization vector for an encryption process, wherein the encryption process uses the initialization vector and a subscription key for encryption.

39. The method of claim 33, wherein creating a table of contents for the next transmission based on the allocated slots comprises: determining a slot number for a broadcast service, assigning the slot number to the broadcast service, and setting the service identifier field of the table of contents entry to indicate the broadcast service.

40. The method of claim 33, wherein each need requested by each shared data service handler further includes a requested frame reservation that designates the number of transmission sequences that a slot assignment will persist.

41. The method of claim 33, further comprising: setting frame reservation fields for each assigned slot, wherein each frame reservation filed designates a number of transmission sequences that a slot assignment will persist.

42. The method of claim 41, further comprising: decrementing frame reservation fields for each assigned slot from each preceding frame transmission, and reclaiming each slot assignment that has a frame reservation field with a value of zero.

43. The method of claim 41, further comprising: updating locator fields that are associated with an assigned slot.

44. The method of claim 41, further comprising: submitting a request to each shared data service handler to update locator fields that are associated with each assigned slot, and receiving updated locator fields from the shared data service handler in response to the request.

45. The method of claim 41, further comprising: requesting an override from a private data service handler, receiving an override request from the private data service handler, assigning a slot in the next frame transmission to a private message in response to the override request.

46. A method for scheduling frame transmissions from a server to a client device, comprising:

using a processor, sending a request to a shared data service handler for needs, wherein the shared data service handler is associated with a registered broadcast service;

using the processor, receiving needs from the shared data service handler in response to the request, wherein each need requested by the shared data service handler includes a requested priority level and a requested allocation of packets for a transmission slot;

using the processor, prioritizing the needs that are received from the shared data service handler;

using the processor, allocating slots for the next transmission frame based on the prioritized needs;

using the processor, creating a table of contents for the next transmission based on the allocated slots;

using the processor, requesting packets from the shared data service handler for the current transmission frame;

using the processor, receiving packets from the shared data service handler for the current transmission frame, wherein the received packets are associated with a previous table of contents from a previous transmission frame;

using the processor, assigning the table of contents for the next transmission to an unused slot in the current transmission frame;

using the processor, assembling packets in the current transmission frame according to previous slot allocations from a previous table of contents, and the assigned slot for the table of contents for the next transmission frame;

assembling a frame header for the current transmission frame, wherein the header frame references the location for the table of contents in the current transmission frame;

assigning a value to a frame number field, wherein the value associated with the frame number field is different for successive frames;

assigning a value to a time field, wherein the value associated with the time field is different for successive frames; and arranging a frame header that includes the frame number field, table of contents locator field, and time field, wherein the frame header corresponds to a packet in the frame transmission that always occurs at the same logical packet number.

47. A method for scheduling retrieval of data on a client device, comprising:

using a processor, identifying a frame header that includes a table of contents locations definition field;

using the processor, locating a table of contents at a location described in the table of contents locations definition field of the frame header;
using the processor, extracting the table of contents from a current transmission frame;
using the processor, identifying an entry in the table of contents with a registered application;
using the processor, sending a request to the registered applications that is associated with the entry in the table of contents;
receiving a data request from the application, wherein the data request includes a requested priority level;
sorting the data requests based on priority level;
requesting highest priority packets from a network layer, wherein the highest priority packets are identified with slots in a subsequent transmission frame;
receiving packets from the network layer that are associated with the subsequent transmission frame;
forwarding the received packets to the handler for the registered application;
assembling a message from the received packets with the handler for the registered application; and
forwarding a completed message from the handler to the application when the message is assembled.

48. The method for scheduling retrieval of data as in claim 47, further comprising: registering an application with a transport layer in the client device, and connecting a handler to the transport layer for the registered application.

49. The method for scheduling retrieval of data as in claim 48, further comprising: disconnecting the handler from the transport layer in response to a terminate request from the application.

50. The method for scheduling retrieval of data as in claim 47, wherein extracting the table of contents includes: retrieving the table of contents from the identified location in the current transmission frame, wherein the table of contents is a forward-looking index into a subsequent transmission frame.

51. The method for scheduling retrieval of data as in claim 47, further comprising: retrieving a time stamp from a frame header in the current frame transmission, and synchronizing an internal clock in the client device based on the time stamp.

52. The method for scheduling retrieval of data as in claim 47, further comprising: authenticating the current frame transmission based on a frame number and time stamp such that replay attacks are ignored by the client device, wherein the frame number is either estimated from an earlier transmission frame, or extracted from a frame header.

53. The method for scheduling retrieval of data as in claim 47, further including: at least one member of a group comprising computing a frame number and retrieving the frame number from a frame header in the current frame transmission, decrypting packets with a feedback-mode packet encryption that is seeded by the frame number such that variation replay attacks are ignored by the client device.

54. The method for scheduling retrieval of data as in claim 47, further comprising: using a frame number, a time stamp, and a packet number to generate an initial value for an decryption process that uses an encryption key, wherein the encryption key is employed by the client device to authenticate retrieved data that is associated with a broadcast service.

55. The method for scheduling retrieval of data of claim 47, further comprising: authenticating logical packets associated with retrieved data, comprising:
decrypting the logical packet;
checking the CRC of the decrypted logical packet;
applying error correction when an invalid CRC of the decrypted logical packet is identified;
decrypting the error-corrected logical packet;
checking the CRC of the decrypted error-corrected packet;
failing authentication when the decrypted logical packet and the decrypted error corrected logical packet have invalid CRCs; and
successfully authentication when either the logical packet or the error corrected logical packet have valid CRCs.

56. The method for scheduling retrieval of data as in claim 47, wherein identifying entries in the table of contents with registered applications further comprises: extracting a service ID from the table of contents, wherein the service ID identifies the registered application.

57. The method for scheduling retrieval of data as in claim 47, further comprising: updating priority levels that are associated with the requested priority levels such that quality of service is maintained for each application on the client device.

58. The method for scheduling retrieval of data as in claim 47, further comprising: receiving a packet from the network layer that is associated with another subsequent transmission frame when the table of contents fails to be retrieved and the frame reservation field from a prior table of contents indicates that the slot assignment associated with the received packet is sticky.

59. The method for scheduling retrieval of data as in claim 47, wherein messages are formatted according to a data type that is associated with a handler for an application on the client device, wherein the data type correspond to one of a compact data type, a sparse data type, and a long data type.

60. The method for scheduling retrieval of data as in claim 59, wherein the handler for a compact data type uses a stream locator from a table-of-contents slot descriptor to determine a starting location for the first compact message in the slot, and subsequent one-packet messages follow the starting location, offset by one packet at a time.

61. The method for scheduling retrieval of data as in claim 59, wherein the handler for a sparse data type uses a stream locator from a table-of-contents slot descriptor to determine a slot location for a fragment of a sparse data stream, and subsequent fragments follow the starting slot location, offset from the first fragment.

62. The method for scheduling retrieval of data as in claim 59, wherein the handler for a long data type uses a stream locator from a table-of-contents slot descriptor to determine sequence numbers for each fragment of a long data stream.

63. A method for scheduling retrieval of private data on a client device, comprising:
using a processor, retrieving a frame header from a current transmission frame;
using the processor, extracting a frame number from the frame header, wherein the frame number for a subsequent transmission frame is different from the frame number for the current transmission frame;
using the processor, identifying a subscriber ID for the client device;
using the processor, determining a private message slot assignment for the client device using the frame number and the subscriber ID; wherein determining a private message slot assignment further comprises: concatenating the subscriber ID, and the current frame number to form an array of bytes, creating a hash value from the array of bytes, determining slot assignments from the array of bytes, wherein the slot assignments correspond to slots in each partition of the transmission frame;
receiving a logical packet from the private message slot assignment in the transmission frame; and
authenticating the logical packet;

forwarding an authenticated logical packet to an application handler on the client device.

64. The method for scheduling retrieval of data of claim 63, wherein determining a private message slot assignment further comprises: determining private message slot assignments from the subscriber ID and the current frame number.

65. The method for scheduling retrieval of data of claim 63, wherein authenticating the logical packet further comprises:
    decrypting the logical packet;
    checking the CRC of the decrypted logical packet;
    applying error correction when an invalid CRC of the decrypted logical packet is identified;
    decrypting the error-corrected logical packet;
    checking the CRC of the decrypted error-corrected packet;
    failing authentication when the decrypted logical packet and the decrypted error corrected logical packet have invalid CRCs; and
    successfully authentication when either the logical packet or the error corrected logical packet have valid CRCs.

* * * * *